(12) United States Patent
Leroy

(10) Patent No.: US 7,720,939 B1
(45) Date of Patent: May 18, 2010

(54) METHOD FOR TRANSFORMING AND VERIFYING DOWNLOADED PROGRAM FRAGMENTS WITH DATA TYPE RESTRICTIONS AND CORRESPONDING SYSTEM

(75) Inventor: Xavier Leroy, Versailles (FR)

(73) Assignee: Trusted Logic, Villepreaux (FR)

( * ) Notice: Subject to any disclaimer, the term of this patent is extended or adjusted under 35 U.S.C. 154(b) by 1125 days.

(21) Appl. No.: 10/069,670

(22) PCT Filed: Aug. 21, 2000

(86) PCT No.: PCT/FR00/02349

§ 371 (c)(1),
(2), (4) Date: Feb. 22, 2002

(87) PCT Pub. No.: WO01/14958

PCT Pub. Date: Mar. 1, 2001

(30) Foreign Application Priority Data

Aug. 23, 1999 (FR) .................................. 99 10697

(51) Int. Cl.
*G06F 15/177* (2006.01)
(52) U.S. Cl. ................... 709/220; 717/126; 709/246
(58) Field of Classification Search .............. None
See application file for complete search history.

(56) References Cited

U.S. PATENT DOCUMENTS

| | | | |
|---|---|---|---|
| 4,571,678 A | 2/1986 | Chaitin | |
| 5,249,295 A | 9/1993 | Briggs et al. | |
| 5,276,881 A * | 1/1994 | Chan et al. | 717/147 |
| 5,694,539 A * | 12/1997 | Haley et al. | 717/135 |
| 5,740,441 A * | 4/1998 | Yellin et al. | 717/134 |
| 5,748,964 A * | 5/1998 | Gosling | 717/126 |
| 5,999,731 A * | 12/1999 | Yellin et al. | 717/126 |
| 6,071,317 A * | 6/2000 | Nagel | 717/128 |
| 6,075,940 A * | 6/2000 | Gosling | 717/126 |
| 6,128,774 A * | 10/2000 | Necula et al. | 717/126 |

(Continued)

OTHER PUBLICATIONS

Gosling J et al : << The JavaTM Language Specification >>, Java Language Specification, XX, XX, pp. 215-236, XP002042923, p. 218, line 10-p. 220, line35.

(Continued)

*Primary Examiner*—Rupal D Dharia
*Assistant Examiner*—Jeffrey R Swearingen
(74) *Attorney, Agent, or Firm*—Holland & Knight LLP; Brian J. Colandreo, Esq.

(57) ABSTRACT

A method and system for transforming and verifying downloaded programs fragments with data type restriction in an embedded system in which a program fragment being temporarily stored a verification process of the stored program fragment object code is executed instruction by instruction so as to discriminate for each instruction the existence of a target, a branching instruction target, a target of an exception handler call or a target of a subroutine call. On the occurrence of a target of a branching instruction as the current instruction, the empty status of the stack is verified and the program fragment is rejected otherwise. A verification process and updating of the effect of the current instruction on the data types of the type stack and the table of register types is performed. The verification process is successfully executed instruction by instruction until the table of register types is stable, with no modification being present, and interrupted with the program fragment being rejected otherwise.

17 Claims, 14 Drawing Sheets

U.S. PATENT DOCUMENTS

| | | | | |
|---|---|---|---|---|
| 6,151,618 | A * | 11/2000 | Wahbe et al. | 717/118 |
| 6,195,774 | B1 * | 2/2001 | Jacobson | 714/727 |
| 6,223,337 | B1 * | 4/2001 | Blume | 717/126 |
| 6,275,976 | B1 * | 8/2001 | Scandura | 717/126 |

OTHER PUBLICATIONS

Gong L et al : << Going beyond the sandbox : an overview of the new security architecture in the JavaDevelopment Kit 1.2 >>. Proceedings of the USENIX Symposium on Internet Technologies and Systems XP002100907 p. 107, right column, line 1—p. 108, left column, line 3.

Guthery : "Java Card : Internet Computing on a Smart Card" IEEE Internet Computing, US, IEEE Service Center, Picataway, NJ. Feb. 1, 1997, pp. 57-59, XP002077647 ISSN : 1089-7801 p. 58, right column, line 19—p. 59, middle column, line 24.

Alfred V. Aho et al : "Compilers : principles, techniques, and tools", Addison-Wesley 1986, Section 9.7.

Tim Lindholm, Frank Yellin : "The java Virtual Machine Specification" Addison-Wesley 1996.

Sun Microsystems Inc. "JavaCard 2.1 Virtual Machine Specification", www site http://java.sun.com/produts/javacard/JCVMSpec.pdf, Mar. 1999., http://java.sun.com/products/javacard/index.html, Jun. 1999.

Gosling A. James : "Java Intermediate Byte Codes", proceedings of the ACM SIGPLAN, Workshop on Intermediate Representations (IR'95), pp. 111-118, Jan. 1995.

Rose et al : "Lightweight Bytecode Verification", proceedings of the Workshop Formal Underspinning of Java, Oct. 1998.

Necula : "Proof-Carrying Code", Proceedings of the $24^{th}$ ACM Symposium Principles of Programming Languages, pp. 106-119.

Sun Microsystems, Inc., "Java Card 2.1 Virtual Machine Specification", 3 pages, Jun. 7, 1989.

VM Spec The class File Format, "http://java.sun.com/docs/books/jvms/first_edition/html/ClassFile.doc.html", 4 pages, Sep. 3, 2009.

* cited by examiner

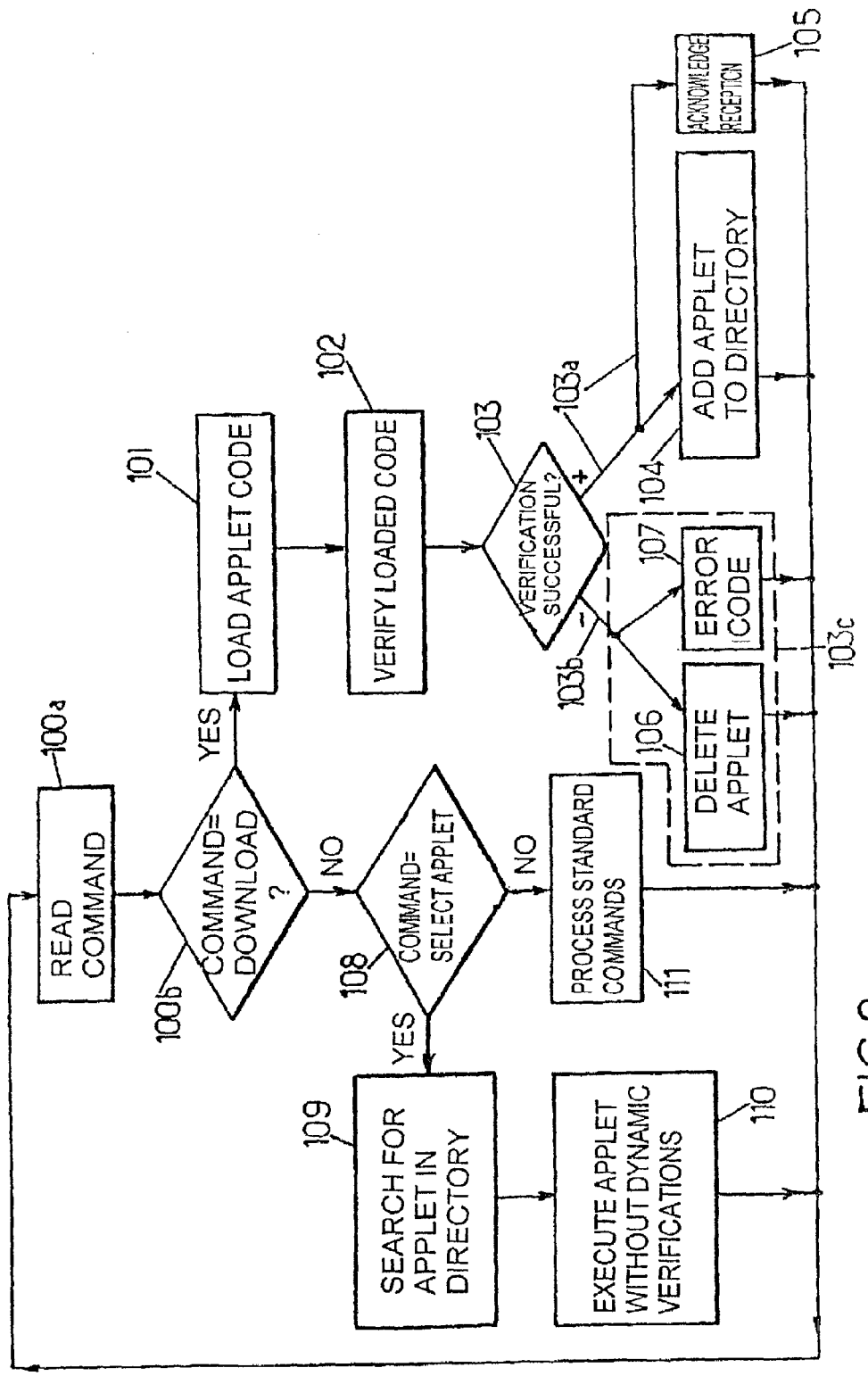
FIG. 2. MANAGEMENT PROTOCOL

VERIFICATION METHOD

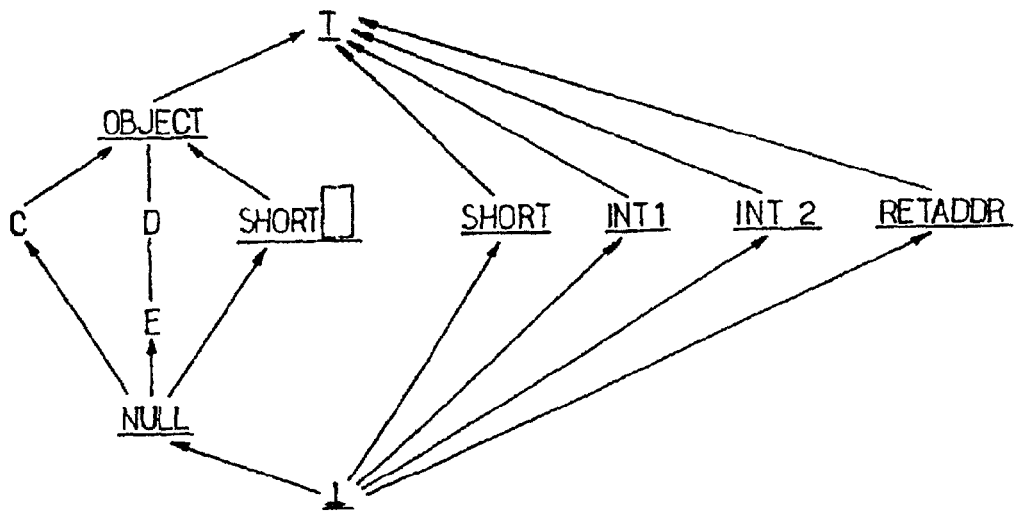
FIG.3b. DATA TYPES AND SUBTYPING RELATION
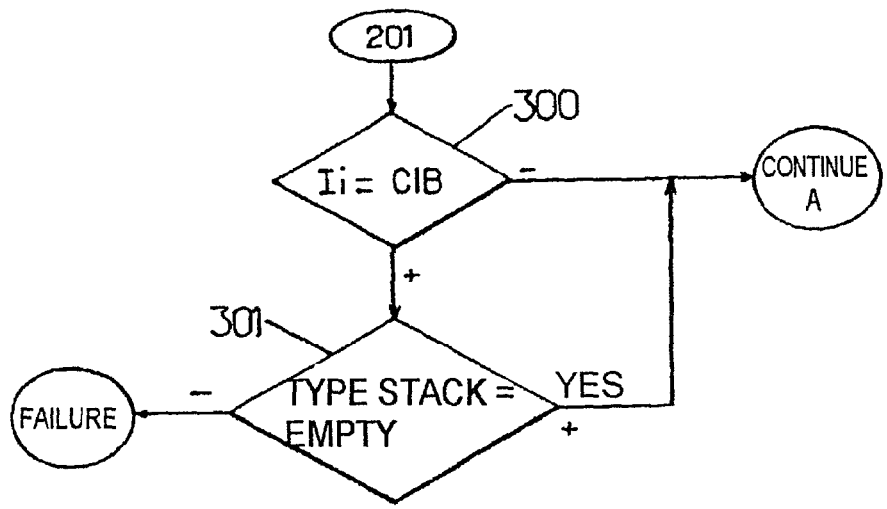
FIG.3c. VERIFICATION: MANAGEMENT OF BRANCHING INSTRUCTION

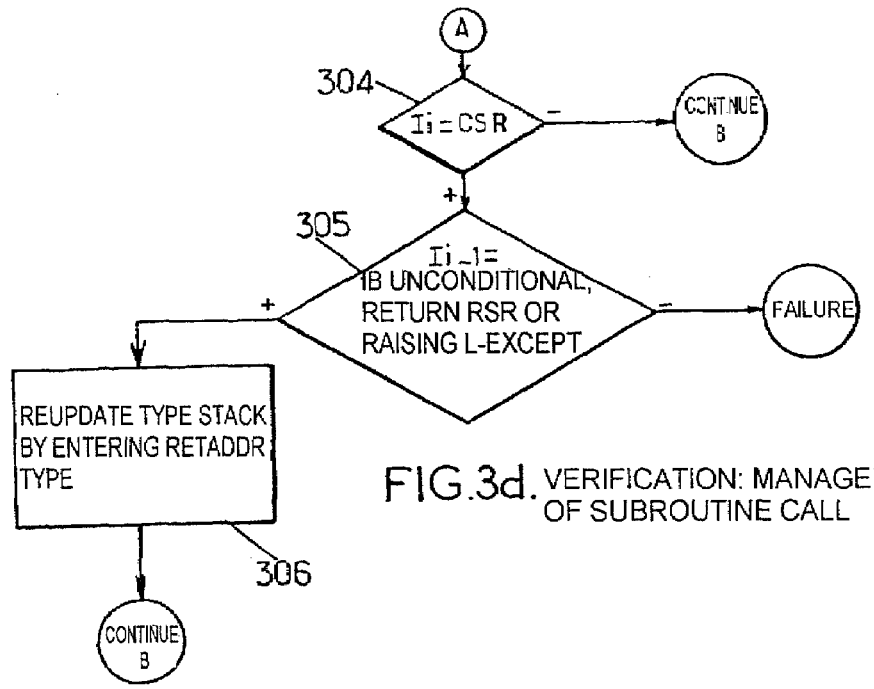
FIG.3d. VERIFICATION: MANAGEMENT OF SUBROUTINE CALL
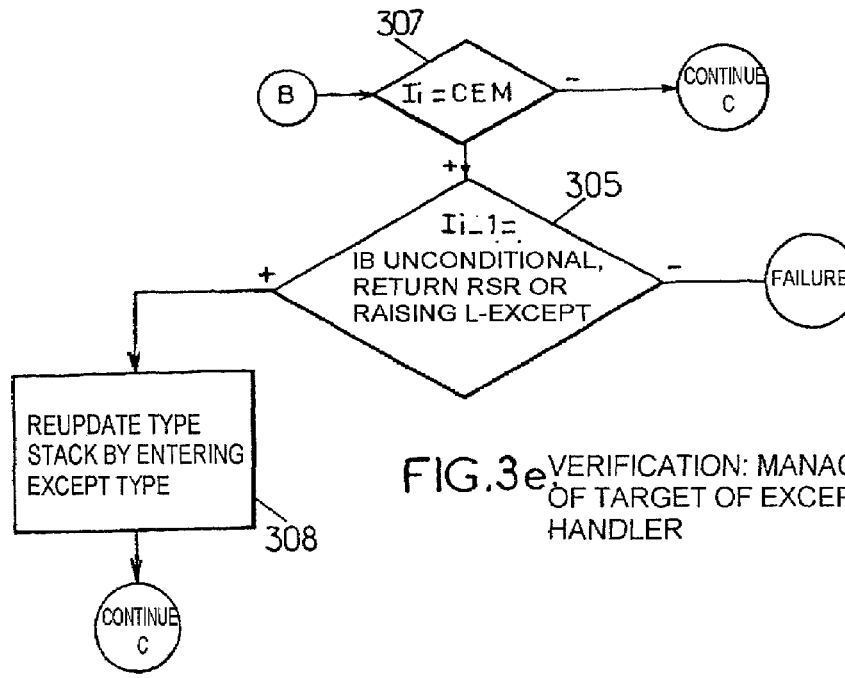
FIG.3e. VERIFICATION: MANAGEMENT OF TARGET OF EXCEPTION HANDLER

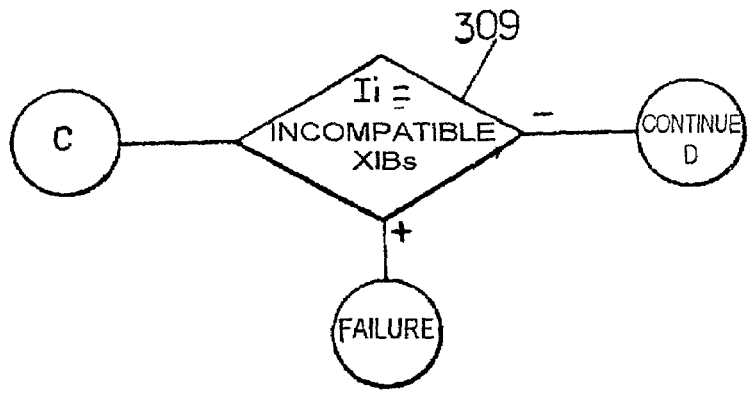
FIG.3f. VERIFICATION: MANAGEMENT OF TARGET OF INCOMPATIBLE BRANCHINGS
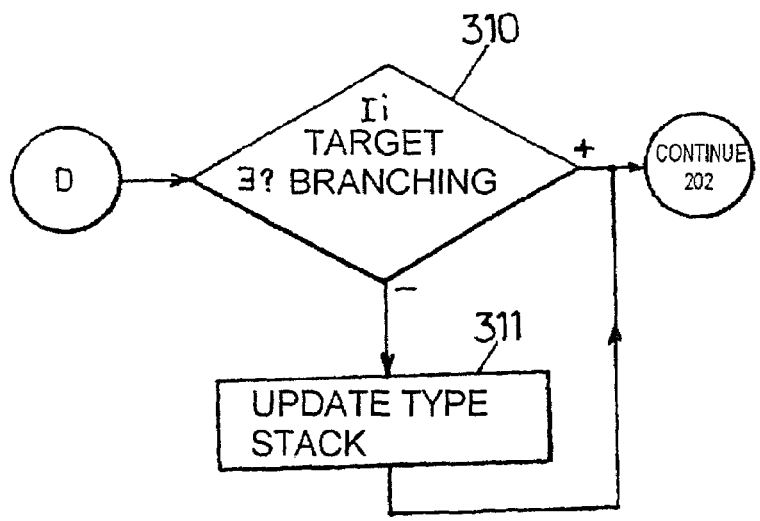
FIG.3g. VERIFICATION: MANAGEMENT OF ABSENCE OF BRANCHING TARGET

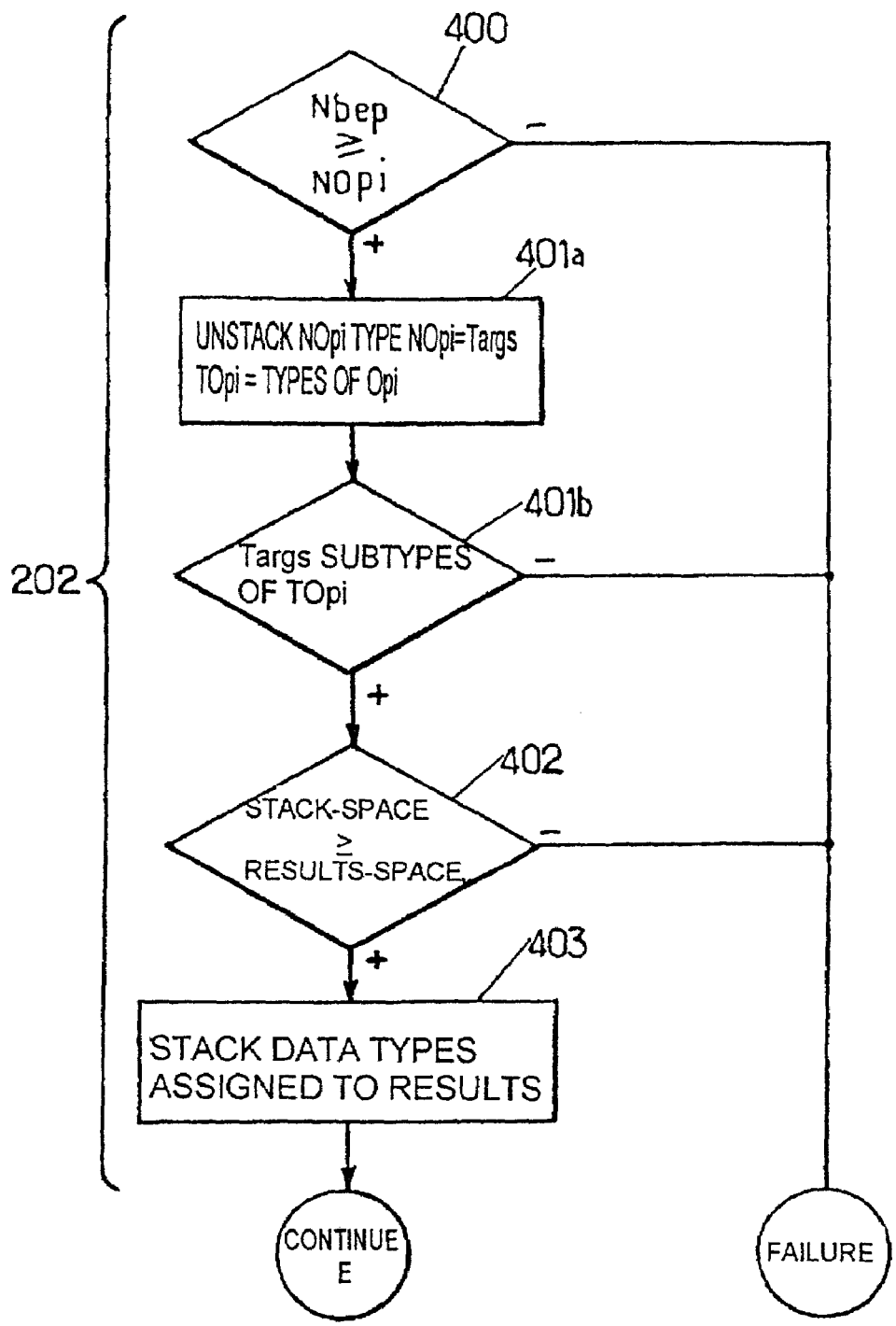
FIG.3h. VERIFICATION: EFFECT OF CURRENT INSTRUCTION ON TYPE STACK

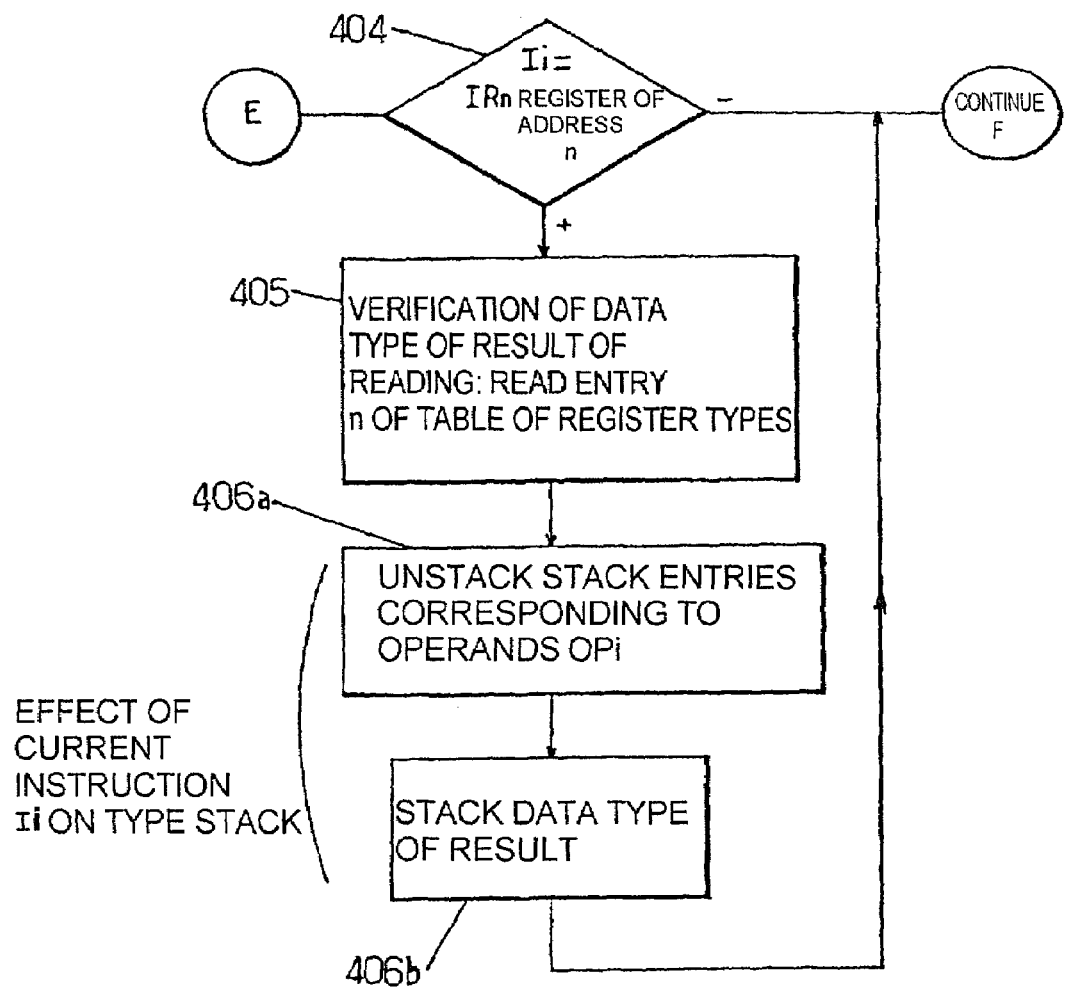
FIG. 3i. VERIFICATION: MANAGEMENT OF INSTRUCTION TO READ REGISTER

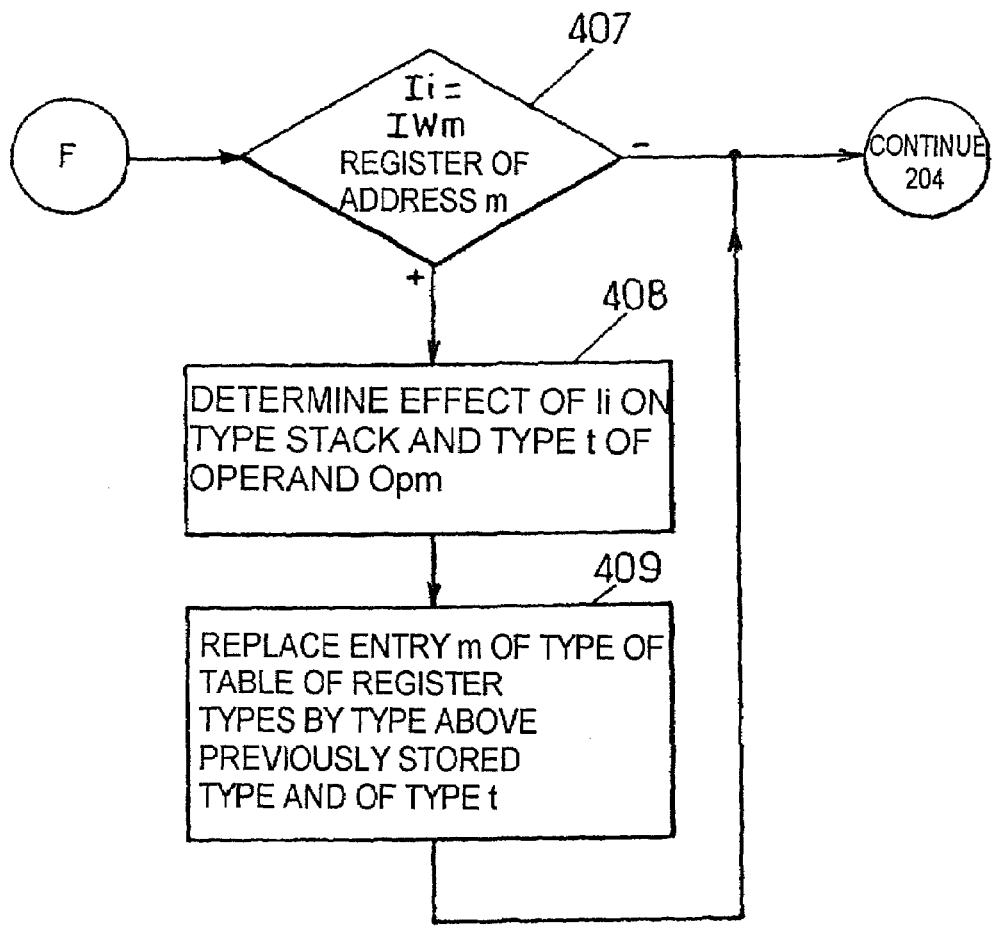
FIG.3j. VERIFICATION: MANAGEMENT OF INSTRUCTION TO WRITE REGISTER

METHOD OF TRANSFORMING CODE TO STANDARDIZED CODE WITH BRANCHING INSTRUCTION WITH EMPTY STACK

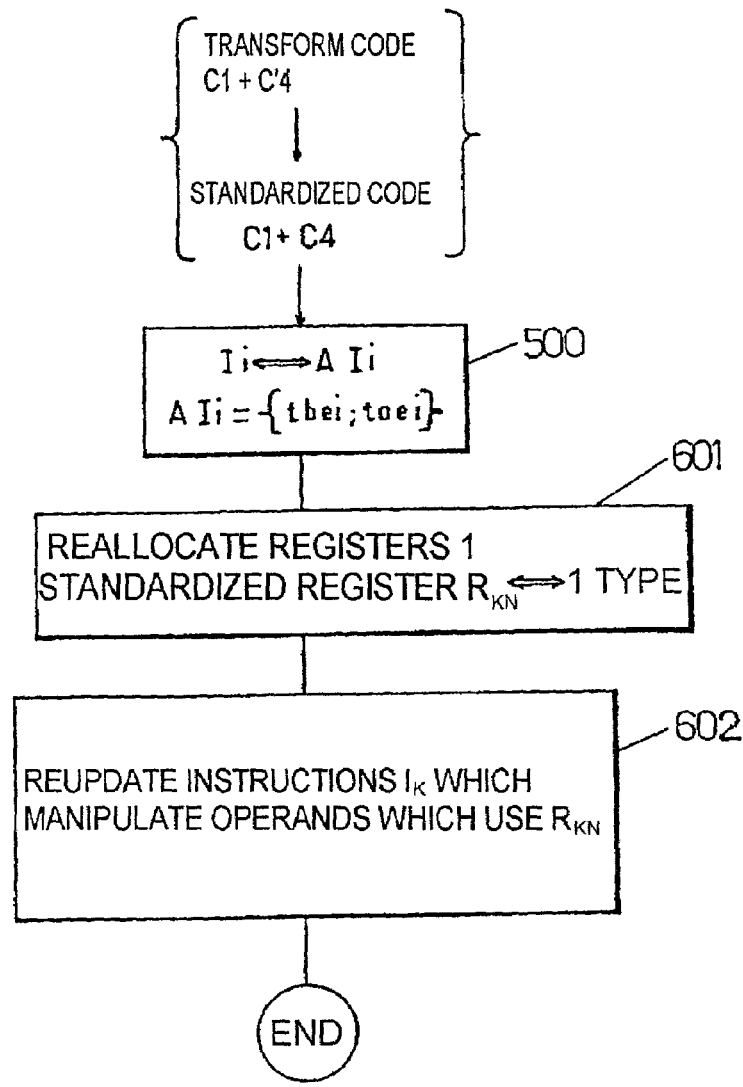
FIG.4b. METHOD OF TRANSFORMING CODE TO STANDARDIZED CODE USING TYPE REGISTERS TRANSFORMATION METHOD ACCORDING TO FIG. 4a TRANSFORMATION METHOD
ACCORDING TO FIG. 4b

METHOD FOR TRANSFORMING AND VERIFYING DOWNLOADED PROGRAM FRAGMENTS WITH DATA TYPE RESTRICTIONS AND CORRESPONDING SYSTEM

RELATED APPLICATIONS

This application claims priority to International Application PCT/FR00/02349 (filed Aug. 21, 2000) and French Application 9910697 (filed Aug. 23, 1999).

BACKGROUND OF THE INVENTION

1. Field of the Invention

The invention relates to a process for managing, a method of verifying and a method of transforming a downloaded program fragment and the corresponding systems, more particularly intended for embedded data-processing systems with limited memory and of computing power resources.

2. Prior Art

In a general way, by reference to FIG. 1a, it is reiterated that embedded data-processing systems 10 include a microprocessor 11; a computer readable storage medium, including, but not limited to: a permanent memory, such as a non-writable memory 12 containing the code of the executable program, and a rewritable, nonvolatile, permanent memory 13 of EEPROM type containing the data stored in the system, a volatile, random-access memory 14 in which the program stores its intermediate results while it is executing; and input/output devices 15 allowing the system to interact with its environment. When the embedded data-processing system consists of a microprocessor card, of the bank-card type, the input/output device 15 consists of a serial link allowing the card to communicate with a terminal, such as a card-reader terminal.

In conventional embedded data-processing systems, the code of the program executed by the system is fixed during construction of the system, or, at the latest, when the latter is customized before delivery to the final user.

More sophisticated embedded data-processing systems have, however, been implemented, these systems being reprogrammable, such as microprocessor cards of the JAVACARD type, for example. Compared to the earlier types, these reprogrammable systems add the possibility of enhancing the program after the system has been put into service, via an operation of downloading program fragments. These program fragments, commonly known as "applets", will be referred to as applets or program fragments indiscriminately in the present description. For a more detailed description of JAVACARD systems, reference could usefully be made to the documentation published by the company SUN MICROSYSTEMS INC., and in particular to the electronically available documentation, JAVACARD technology chapter, on the World Wide Web at site http://java.sun.com/products/javacard/index.html, available since June 1999.

FIG. 1b illustrates the architecture of such a reprogrammable embedded data-processing system. This architecture is similar to that of a conventional embedded system, apart from the fact that the reprogrammable embedded system can in addition receive applets via one of its input/output devices, then store them in its permanent memory 13 from which they can then be executed complementing the main program.

For reasons of portability between different embedded data-processing systems, applets take the form of code for a standard virtual machine. This code is not directly executable by the microprocessor 11, but it has to be interpreted in software terms by a virtual machine 16, which consists of a program resident in a non-writable permanent memory 12. In the above-mentioned example of JAVACARD cards, the virtual machine used is a subset of the JAVA virtual machine. For a description of the specifications relating to the JAVA virtual machine and of the virtual machine used, reference could usefully be made to the work published by Tim LINDHOLM and Frank YELLIN, entitled "The Java Virtual Machine Specification", Addison-Wesley 1996, and to the documentation published by the company SUN MICROSYSTEMS INC. "JAVACARD 2.1 Virtual Machine Specification", documentation available electronically on the World Wide Web at site http://java.sun.com/products/javacard/JCVMSpec.pdf, since March 1999.

The operation of downloading applets onto an embedded data-processing system in service poses considerable security problems. An applet which is unintentionally, or even deliberately, badly written may incorrectly modify data present on the system, prevent the main program from being executed correctly or at the right time, or even modify other applets downloaded previously, making them unusable or harmful.

An applet written by a computer hacker may also divulge confidential information stored in the system, information such as the access code in the case of a bank card, for example.

At the present time, three solutions have been proposed with a view to remedying the problem of applet security.

A first solution consists in using cryptographic signatures in order to accept only applets originating from trusted organizations or persons.

In the abovementioned example of a bank card, only the applets bearing the cryptographic signature of the bank having issued the card are accepted and executed by the card, any other unsigned applet being rejected in the course of the downloading operation. An ill-intentioned user of the card, not having available encryption keys from the bank, will therefore be unable to execute an unsigned and dangerous applet on the card.

This first solution is well suited to the case where all the applets originate from the same single source, the bank in the abovementioned example. This solution is difficult to apply in the case where the applets originate from several sources, such as, in the example of a bank card, the card manufacturer, the bank, the organizations managing bank card services, the large commercial distribution organizations offering customers loyalty programs and legitimately offering to download specific applets onto the card. The sharing and the holding among these various economic participants of the encryption keys necessary for the electronic signature of the applets pose major technical, economic and legal problems.

A second solution consists in carrying out dynamic access and typing checks while executing the applets.

In this solution, the virtual machine carries out a certain number of checks, while executing the applets, such as:

memory access check: upon each read or write in a memory area, the virtual machine verifies the right of access by the applet to the corresponding data;

dynamic verification of the data types: upon each instruction from the applet, the virtual machine verifies that the constraints on the data types are satisfied. By way of example, the virtual machine may apply special processing to data such as valid memory addresses, and prevent the applet generating invalid memory addresses by way of integer/address conversions or arithmetic operations on the addresses;

detection of stack overflows and of illegal accesses to the execution stack of the virtual machine, which, under certain conditions, are likely to disturb the operation thereof, to the point of circumventing the preceding check mechanisms.

This second solution allows execution of a wide range of applets under satisfactory security conditions. However, it presents the drawback of a considerable slowing of the execution, caused by the range of dynamic verifications. In order to obtain a reduction in this slowing effect, some of these verifications can be managed by the microprocessor itself, at the cost, however, of an increase in the complexity thereof and thus of the cost price of the embedded system. Such verifications furthermore increase the random-access and permanent memory requirements of the system, because, of the additional type information which must be associated with the data handled.

A third solution consists in carrying out a static verification of the code of the applet during the downloading.

In this solution, this static verification simulates the execution of the applet at the level of the data types and establishes, once and for all, that the code of the applet complies with the rule of data types and of access control imposed by the virtual machine and does not cause a stack overflow. If this static verification is successful, the applet can then be executed without it being necessary dynamically to verify that this rule is complied with. In the event that the static verification process fails, the embedded system rejects the "applet" and does not allow its subsequent execution. For a more detailed description of the abovementioned third solution, reference could usefully be made to the work published by Tim LINDHOLM and Frank YELLIN quoted above, to the article published by James A. GOSLING entitled "Java Intermediate Byte Codes", proceedings of the ACM SIGPLAN, Workshop on Intermediate Representations (IR'95), pages 111-118, January 1995, and to the U.S. Pat. No. 5,748,964 granted on May 5, 1998.

Compared with the second solution, the third solution presents the advantage of a much more rapid execution of the applets, since the virtual machine does not carry out any verification during execution.

The third solution, however, presents the drawback of a process of static verification of the code which is complex and expensive, both in terms of size of code necessary to conduct this process and in terms of size of random-access memory necessary to contain the intermediate results of the verification, and in terms of computation time. By way of illustrative example, the code verification incorporated in the JAVA JDK system marketed by SUN MICROSYSTEMS represents about 50 kbytes of machine code, and its consumption in terms of random-access memory is proportional to (Tp+Tr)× Nb, where Tp designates the maximum stack space, Tr designates the maximum number of registers and Nb designates the maximum number of branch targets used by a subroutine, also commonly called method, of the applet. These memory requirements greatly exceed the capacities of the resources of most present-day embedded data-processing systems, especially of commercially available microprocessor cards.

Several variants of the third solution have been proposed, in which the publisher of the applet sends to the verifier, in addition to the code of the applet, a certain amount of specific supplementary information such as precalculated data types or preestablished proof of correct data typing. For a more detailed description of the corresponding procedures, reference could usefully be made to the articles published by Eva ROSE and Kristoffer HØGSBRO ROSE, "Lightweight Bytecode Verification", proceedings of the Workshop on Formal Underspinning of JAVA, October 1998, and by George C. NECULA, "Proof-Carrying Code", Proceedings of the 24th ACM Symposium on Principles of Programming Languages, pages 106-119, respectively.

This supplementary information makes it possible to verify the code more rapidly and slightly to reduce the size of the verification program code but does not make it possible, however, to reduce the requirements for random-access memory, and even increases them, very substantially, in the case of the correct-data-typing preestablished-proof information.

SUMMARY OF THE INVENTION

The object of the present invention is to remedy the abovementioned drawbacks of the prior art.

In particular, one subject of the present invention is the implementation of a process for managing a downloaded program fragment, or applet, allowing execution of the latter by an embedded data-processing system having limited resources available, such as a microprocessor card.

Another subject of the present invention is also the implementation of a method of verifying a downloaded program fragment, or applet, in which a process of static verification of the code of the applet is conducted when it is downloaded, this process possibly being similar, at least in its principle, to the third solution described above, but into which new verification techniques are introduced, so as to allow execution of this verification within the memory size and computation speed value limits imposed by the microprocessor cards and other low-power embedded data-processing systems.

Another subject of the present invention is also the implementation of methods of transforming program fragments of conventional type obtained, for example, by the use of a JAVA compiler, into standardized program fragments, or applets, satisfying, a priori, the verification criteria of the verification method which is the subject of the invention, with a view to accelerating the process of verifying and executing the latter in present-day microprocessor cards or embedded data-processing systems.

Another subject of the present invention is, finally, the production of embedded data-processing systems enabling the implementation of the abovementioned process for managing and method of verifying a downloaded program fragment as well as of data-processing systems enabling the implementation of the methods of transforming conventional program fragments, or applets, into standardized program fragments, or applets, as mentioned above.

The process for managing a downloaded program fragment downloaded to a reprogrammable embedded system, which is the subject of the present invention, applies especially to a microprocessor card provided with a rewritable memory. The program fragment consists of an object code, a series of instructions, executable by the microprocessor of the embedded system by means of a virtual machine provided with an execution stack and with local variables or registers manipulated by these instructions and used to interpret this object code. The embedded system is interconnected with a terminal.

It is noteworthy in that it consists at least, at the level of the embedded system, in detecting a command for downloading the program fragment. On a positive response to the step consisting in detecting a download command, it further consists in reading the object code constituting the program fragment and in temporarily storing this object code in the rewritable memory. The whole of the object code stored in memory is subjected to a verification process, instruction by instruction. The verification process consists at least in a step for initializing the type stack and the register type array representing the state of the virtual machine at the start of the execution of the temporarily stored object code and in a succession of steps for verifying, instruction by instruction, the existence, for each current instruction, of a target, branch-instruction target, target of an exception handler, and in a verification and an updating of the effect of the current instruction on the type stack and on the register type array. In the event of an unsuccessful verification of the object code, the process which is the subject of the invention consists in deleting the temporarily stored program fragment, if the latter is not stored in the directory of available program fragments, and in sending an error code to the reader.

The method of verifying a program fragment downloaded to an embedded system, which is the subject of the invention, applies in particular to a microprocessor card equipped with a rewritable memory. The program fragment consists of an object code and includes at least one subroutine, a series of instructions, executable by the microprocessor of the embedded system by means of a virtual machine provided with an execution stack and with operand registers manipulated by these instructions, and used to interpret this object code. The embedded system is interconnected with a reader.

It is noteworthy in that, following the detection of a download command and the storage of the object code constituting the program fragment in the rewritable memory, it consists, for each subroutine, in carrying out a step for initializing the type stack and the register type array by data representing the state of the virtual machine at the start of the execution of the temporarily stored object code, in carrying out a verification of the temporarily stored object code instruction by instruction, by discerning the existence, for each current instruction, of a branch-instruction target, of a target of an exception-handler call or of a target of a subroutine call, and in carrying out a verification and an updating of the effect of the current instruction on the data types of the type stack and of the register type array, on the basis of the existence of a branch-instruction target, of a target of a subroutine call or of a target of an exception-handler call. The verification is successful when the register type array is not modified in the course of a verification of all the instructions, the verification process being carried out instruction by instruction until the register type array is stable, with no modification present. Otherwise the verification process is interrupted.

The method of transforming an object code of a program fragment into a standardized object code for this same program fragment, which is the subject of the present invention, applies to an object code of a program fragment in which the operands of each instruction belong to the data types manipulated by this instruction, the execution stack does not exhibit any overflow phenomenon and, for each branch instruction, the type of the variables of the stack at this branch is the same as at the targets of this branch. The standardized object code obtained is such that the operands of each instruction belong to the data types manipulated by this instruction, the execution stack does not exhibit any overflow phenomenon and the execution stack is empty at each branch-target instruction.

It is noteworthy in that it consists, for all the instructions of the object code, in annotating each current instruction with the data type of the execution stack before and after the execution of this instruction, the annotation data being calculated by means of an analysis of the data stream relating to this instruction, in detecting, within the instructions and within each current instruction, the existence of branches for which the execution stack is not empty, the detection operation being carried out on the basis of the annotation data of the type of stack variables allocated to each current instruction. On detection of a non-empty execution stack, it further consists in inserting instructions to transfer stack variables on either side of these branches or of these branch targets in order to empty the contents of the execution stack into temporary registers before this branch and to reestablish the execution stack from the temporary registers after this branch, and in not inserting any transfer instruction otherwise.

This method thus makes it possible to obtain a standardized object code for this same program fragment, in which the execution stack is empty at each branch instruction and branch-target instruction, in the absence of any modification of the execution of the program fragment.

The method of transforming an object code of a program fragment into a standardized object code for this same program fragment, which is the subject of the present invention, applies, moreover, to an object code of a program fragment in which the operands of each instruction belong to the data types manipulated by this instruction, and a operand of given type written into a register by an instruction of this object code is read back from this same register by another instruction of this object code with the same given data type. The standardized object code obtained is such that the operands belong to the data types manipulated by this instruction, one and the same data type being allocated to the same register throughout the standardized object code.

It is noteworthy in that it consists, for all the instructions of the object code, in annotating each current instruction with the data type of the registers before and after the execution of this instruction, the annotation data being calculated by means of an analysis of the data stream relating to this instruction, and in carrying out a reallocation of the original registers employed with different types, by dividing these original registers into separate standardized registers. One standardized register is allocated to each data type used. A reupdating of the instructions which manipulate the operands which use the standardized registers is carried out.

The process for managing a program fragment, the method of verifying a program fragment, the methods of transforming object code of program fragments into standardized object code and the corresponding systems, which are the subjects of the present invention, find application in the development of reprogrammable embedded systems, such as microprocessor cards, especially in the Java environment.

BRIEF DESCRIPTION OF THE DRAWINGS

They will be better understood on reading the description and on perusing the drawings below:

FIG. 2 represents a flow chart illustrating the process for managing a program fragment downloaded to a reprogrammable embedded system, FIG. 3b represents a diagram illustrating data types and sub-typing relationships implemented by the method of managing and the method of verifying a downloaded program fragment, which is the subject of the present invention, FIG. 3c represents a detail of the verification method according to FIG. 3a, relating to the managing of a branch instruction, FIG. 3*d* represents a detail of the verification method according to FIG. 3*a*, relating to the managing of a subroutine-call instruction, FIG. 3*e* represents a detail of the verification method according to FIG. 3*a*, relating to the managing of an exception-handler target, FIG. 3*f* represents a detail of the verification method according to FIG. 3*a*, relating to the managing of a target of incompatible branches, FIG. 3*g* represents a detail of the verification method according to FIG. 3*a*, relating to the managing of an absence of branch target, FIG. 3*h* represents a detail of the verification method according to FIG. 3*a*, relating to the managing of the effect of the current instruction on the type stack, FIG. 3*i* represents a detail of the verification method according to FIG. 3*a*, relating to the managing of a register read instruction, FIG. 3*j* represents a detail of the verification method according to FIG. 3*a*, relating to the managing of a register write instruction, FIG. 4*b* represents a flow chart illustrating a method of transforming an object code of a program fragment into a standardized object code for this same program fragment, making use of typed registers, a single specific data type being assigned to each register.

DESCRIPTION OF THE PREFERRED EMBODIMENTS

Figure 1A:
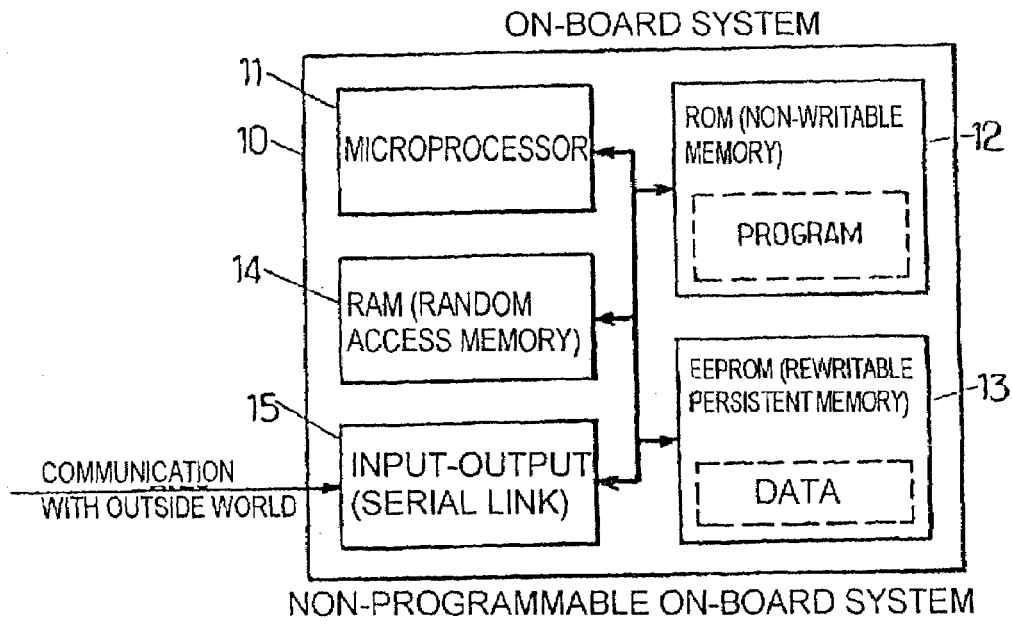
FIG. 1a represents the architecture of a prior art embedded system.

In general, it is indicated that the process for managing and the method of verifying and transforming a downloaded program fragment, which is the subject of the present invention, and the corresponding systems, are implemented using a software architecture for the secure downloading and execution of applets on an embedded data-processing system with limited resources, such as, in particular, microprocessor cards.

In general, it is indicated that the description below concerns the application of the invention in the context of reprogrammable microprocessor cards of JAVACARD type, cf. documentation available electronically from the company SUN MICROSYSTEMS INC., JAVACARD Technology heading mentioned previously in the description.

However, the present invention is applicable to any embedded system which is reprogrammable by downloading an applet which is written in the code of a virtual machine including an execution stack, local variables or registers, and of which the execution model is strongly typed, each instruction of the code of the applet being applied only to specific data types. The process for managing a program fragment downloaded to a reprogrammable embedded system, which is the subject of the present invention, will now be described in more detail with reference to FIG. 2.

With reference to the abovementioned figure, it is indicated that the object code which makes up the program fragment or applet consists of a series of instructions which can be executed by the microprocessor of the embedded system by means of the abovementioned virtual machine. The virtual machine is used to interpret the abovementioned object code. The embedded system is interconnected with a terminal via, for instance, a serial link.

With reference to the abovementioned FIG. 2, the management process which is the subject of the present invention consists at least, in the embedded system, in detecting a command to download this program fragment in a step 100*a*, 100*b*. Thus, step 100*a* may consist of a step for reading the abovementioned command, and step 100*b* may consist of a step for testing the command which has been read and verifying the existence of a download command.

On a positive response to the abovementioned step 100*a*, 100*b* for detecting a download command, the process which is the subject of the present invention then consists in reading, at step 101, the object code which makes up the relevant program fragment, and temporarily storing the abovementioned object code in the memory of the embedded data-processing system. The abovementioned temporary storage operation can be executed either in the rewritable memory or, if appropriate, in the random-access memory of the embedded system, when the latter has sufficient capacity. The step for reading the object code and temporarily storing it in the rewritable memory is designated load applet code in FIG. 2.

The abovementioned step is then followed by a step 102 consisting in submitting the whole of the temporarily stored object code to a process of verification, instruction by instruction, of the abovementioned object code.

The verification process consists, at least in a step for initializing the type stack and the data type array representing the state of the virtual machine at the start of execution of the temporarily stored object code, and in a succession of steps for verifying, instruction by instruction, by discerning the existence, for each current instruction, designated of a target such as a branch-instruction target designated CIB, an exception-handler call target or a target of a subroutine call. A verification and updating of the effect of the current instruction $I_t$ on the type stack and on the register type array is carried out.

When the verification 103 is successful at step 103*a*, the process which is the subject of the present invention consists in storing, at step 104, the downloaded program fragment in a directory of available program fragments, and in sending to the reader, at step 105, a positive reception acknowledgment.

On the other hand, in the case of unsuccessful verification of the object code at step 103*b*, the process which is the subject of the present invention consists in inhibiting, in a step 103*c*, any execution on the embedded system of the temporarily stored program fragment. The inhibition step 103*c* can be implemented in various ways. As a nonlimiting example, this step can consist in deleting, at step 106, the temporarily stored program fragment, without storing this program fragment in the directory of available program fragments and, at step 107, in sending an error code to the reader. Steps 107 and 105 can be implemented either sequentially after steps 106 and 104 respectively, or in multitasking operation with them.

With reference to the same FIG. 2, on a negative response to the step consisting in detecting a download command at step 100*b*, the process which is the subject of the present invention consists in detecting, in a step 108, a command to select an available program fragment from a directory of program fragments and, on a positive response to step 108, having detected the selection of an available program fragment, in calling, at step 109, this selected available program fragment in order to execute it. Step 109 is then followed by a step 110 for executing the called available program fragment by means of the virtual machine, with no dynamic verification of variable types, rights of access to the objects which are manipulated by the called available program fragment, or overflow of the execution stack when each instruction is executed.

In the case where a negative response is obtained at step 108, this step consisting in detecting a command to select a called available program fragment, the process which is the subject of the present invention consists in proceeding, at a step 111, to process the standard commands of the embedded system.

Regarding the absence of dynamic verification of type or rights of access to objects of, for instance, JAVACARD type, it is indicated that this absence of verification does not compromise the security of the card, because the code of the applet has necessarily successfully undergone verification.

More specifically, it is indicated that the code verification which is carried out, in accordance with the method which is the subject of the present invention, on the microprocessor card or embedded data-processing system is more selective than the customary verification of codes for the virtual JAVA machine as described in the work entitled "The Java Virtual Machine Specification" mentioned previously in the description.

However, any code of the JAVA virtual machine which is correct as far as the conventional JAVA verifier is concerned can be transformed into an equivalent code which is capable of successfully undergoing the code verification which is carried out on the microprocessor card.

Whereas it is possible to imagine writing directly JAVA codes which satisfy the verification criteria mentioned previously in the context of implementing the process which is the subject of the present invention, a noteworthy object of the latter is also the implementation of a method of automatic transformation of any standard JAVA code into a standardized code for the same program fragment, necessarily satisfying the verification criteria implemented as mentioned above. The method of transformation into standardized code, and the corresponding system, will be described in detail later in the description.

A more detailed description of the method of verifying a program fragment, or applet, in accordance with the subject of the present invention, will now be given with reference to FIG. 3a and the subsequent figures.

In general, it is indicated that the verification method which is the subject of the present invention can be implemented either as part of the process for managing a program fragment which is the subject of the present invention as described above with reference to FIG. 2, or independently, to provide whatever verification process is judged necessary.

In general, it is indicated that a program fragment is made up of an object code including at least one subroutine, more commonly called a method, and is made up of a series of instructions which can be executed by the microprocessor of the embedded system by means of the virtual machine.

Figure 3A:
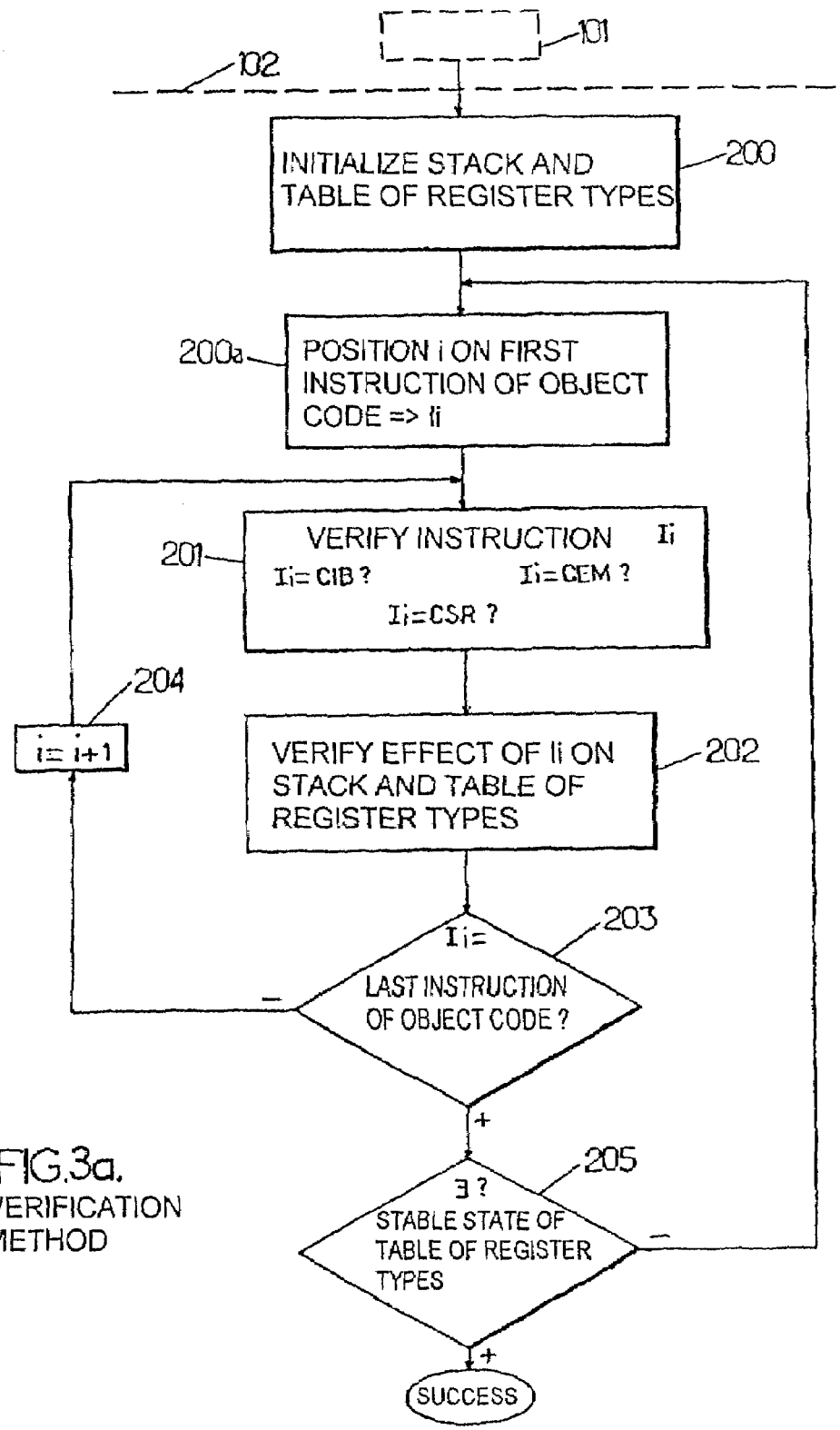
FIG. 3a represents, by way of illustration, a flow chart of a method of verifying a downloaded program fragment in accordance with the subject of the present invention.

As shown in FIG. 3a, the verification method consists, for each subroutine, in carrying out a step 200 for initializing the type stack and the register type array of the virtual machine by data representing the state of this virtual machine at the start of execution of the object code which is the subject of the verification. This object code can be stored temporarily as described above with reference to implementation of the process which is the subject of the present invention.

The abovementioned step 200 is then followed by a step 200a consisting in positioning the reading of the current instruction $I_i$, index i, on the first instruction of the object code. Step 200a is followed by a step 201 consisting in carrying out a verification of the above-mentioned object code, instruction by instruction, by discerning the existence, for each current instruction, designated $I_i$, of a branch-instruction target CIB, of a target of an exception-handler call, designated CEM, or of a target of a subroutine call CSR.

The verification step 201 is followed by a step 202 for verifying and updating the effect of the current instruction $I_i$ on the data types of the type stack and of the register type array, as a function of the existence, for the current instruction which is pointed to by another instruction, of a branch-instruction target CIB, of a target of a subroutine call CSR or of a target of an exception-handler call CEM.

Step 202 for the current instruction $I_i$ is followed by a step 203 to test whether the last instruction has been reached, the test written as:

$I_i$=last instruction of the object code?

On a negative response to test 203, the process passes to the next instruction 204, written i=i+1, and on return to step 201.

It is indicated that the abovementioned verification, at step 202, is successful when the register type array is not modified during verification of all the instructions $I_i$ which make up the object code. For this purpose, a test 205 of the existence of a stable state of the register type array is provided. This test is written:

∃? Stable state of register type array.

On a positive response to test 205, the verification has been successful.

On the other hand, in the case where no absence of modification is noticed, the verification process is repeated and reinitiated by returning to step 200a. It is demonstrated that the process is guaranteed to end after a maximum of Nr×H iterations, where Nr designates the number of registers used and H designates a constant depending on the subtyping relation.

Various indications concerning the types of variables manipulated in the course of the verification process described above with reference to FIG. 3a will now be given with reference to FIG. 3b.

The abovementioned variable types include at least class identifiers corresponding to object classes defined in the program fragment which is subjected to verification, numeric variable types including at least a short type, an integer coded on p bits, where the value of p can be 16, and a type for the return address of a jump instruction JSR, this address type being denoted retaddr, a null type relating to references of null objects, an object type relating to the objects proper, a specific type ⊥ representing the intersection of all the types and corresponding to the zero value, another specific type T representing the union of all the types and corresponding to any type of values.

With reference to FIG. 3b, it is indicated that all the abovementioned variable types verify a subtyping relation:

object∈T;

short, retaddr∈T;

⊥∈null, short, retaddr

A more specific example of a process of verification as illustrated in FIG. 3a will now be given, with reference to a data structure example, which is shown in array T1 in the annex.

The abovementioned example concerns an applet written in JAVA code.

The verification process accesses the code of the subroutine which forms the applet which is subjected to verification via a pointer to instruction $I_i$ which is being verified.

The verification process records the size and type of the execution stack at the current instruction $I_i$ corresponding to saload in the example of the abovementioned Array T1.

The verification process then stores the size and type of the execution stack at the current instruction in the type stack via its type stack pointer.

As mentioned above in the description, this type stack reflects the state of the execution stack of the virtual machine at the current instruction $I_i$. In the example shown in array T1, at the time of the future execution of instruction the stack will contain three entries: a reference to an object of class C, a reference to an integer array coded on p=16 bits, the type short[ ], and an integer of p=16 bits of type short. This is also shown in the type stack, which also contains three entries: C, the type of the objects of class C, short[ ], the type of the arrays of integers p=16 bits and short, the type of integers p=16 bits.

Another noteworthy data structure consists of aft register type array, this array reflecting the state of the registers, that is to say of the registers which store the local variables, of the virtual machine.

Continuing the example indicated in array T1, it is indicated that entry 0 of the register type array contains type C, i.e. at the time of the future execution of the current instruction $I_i$=saload, register 0 is guaranteed to contain a reference to an object of class C.

The various types which are manipulated during the verification and stored in the register type array and in the type stack are represented in FIG. 3b. These types include:

- class identifiers CB corresponding to specific object classes which are defined in the applet;
- basic types, such as short integer coded on p=16 bits, int1 and int2, the most and least significant p bits respectively of integers coded on, e.g., 2p bits, or retaddr, the return address of an instruction as mentioned above;
- the type null, representing the references of null objects.

Regarding the subtyping relation, it is indicated that a type T1 is a subtype of a type T2 if any valid value of type T1 is also a valid value of type T2. The subtyping between class identifier reflects the inheritance hierarchy between classes of the applet. On the other types, subtyping is defined by the lattice shown in FIG. 3b, where ⊥ is a subtype of all the types and all the types are subtypes of T.

The sequence of the process of verifying a subroutine which forms an applet is as follows, referring to the abovementioned array T1.

The verification process is carried out independently on each subroutine of the applet. For each subroutine, the process carries out one or more verification passes on the instructions of the relevant subroutine. The pseudocode of the verification process is given in array T2 in the annex.

The process of verifying a subroutine begins with initializing the type stack and the register type array shown in array T1, this initialization reflecting the state of the virtual machine at the start of execution of the subroutine being examined.

The type stack is initially empty, the stack pointer equals zero, and the register types are initialized with the types of the parameters of the subroutine, illustrating the fact that the virtual machine passes the parameters of this subroutine in these registers. The register types allocated by the subroutine are initialized to data types ⊥, illustrating the fact that the virtual machine initializes these registers to zero at the start of execution of the subroutine.

Next, one or more verification passes on the instructions and on each current instruction $I_i$ of the subroutine are carried out.

At the end of the implemented verification pass, or of a succession of passes for example, the verification process determines whether the register types contained in the register type array represented in array T1 of the annex have changed during the verification pass. In the absence of change, verification is terminated and a success code is returned to the main program, which makes it possible to send the positive reception acknowledgment at step 105 of the management process shown in FIG. 2.

If a change to the abovementioned register type array is present, the verification process repeats the verification pass until the register types contained in the register type array are stable.

The sequence proper of a verification pass which is carried out one or more times until the register type array is stable will now be described with reference to FIGS. 3c to 3j.

For each current instruction $I_i$, the following verifications are carried out:

With reference to FIG. 3a at step 201, the verification process determines whether the current instruction $I_i$ is the target of a branch instruction, a subroutine call or an exception-handler call, as mentioned above. This verification is carried out by examining the branch instructions in the code of the subroutine and the exception handlers associated with this subroutine.

With reference to FIG. 3c which begins with step 201, when the current instruction $I_i$ is the target of a branch instruction, this condition being implemented by a test 300 designated by $I_i$=CIB, this branch being unconditional or conditional, the verification process checks that the type stack is empty at this point of the subroutine by a test 301. On a positive response to the test 301, the verification process is continued by a context continuation step marked continue A. On a negative response to the test 301, the type stack not being empty, the verification fails and the applet is rejected. This failure is represented by the Failure step.

With reference to FIG. 3d which begins with the continue A step, when the current instruction $I_i$ is the target of a subroutine call, this condition being implemented by a test 304 $I_i$=CSR, the verification process verifies, in a test 305, that the previous instruction $I_{i-1}$ does not continue in sequence. This verification is implemented by a test step 305 when the previous instruction is an unconditional branch, a subroutine return or a withdrawal of an exception. The test at step 305 is marked as follows:

$I_{i-1}$=$IB_{unconditional}$, return RSR or withdrawal L-EXCEPT.

On a negative response to test 305, the verification process fails in a Failure step. On the other hand, on a positive response to test 305, the verification process reinitializes the type stack 306 in such a way that it contains exactly one entry of retaddr type, the return address of the abovementioned subroutine. If the current instruction $I_i$ at step 304 is not the target of a subroutine call, the verification process is continued in the context at the continue B step.

With reference to FIG. 3e, when the current instruction $I_i$ is the target of an exception handler, this condition being implemented by a test 307 marked $I_i$=CEM, where CEM designates the target of an exception handler, this condition is implemented by a test 307, marked:

$I_i$=CEM.

On a positive response to test 307, the process verifies that the previous instruction is an unconditional branch, a subroutine return or a withdrawal of exceptions by a test 305, marked:

$I_{i-1}$=IB$_{unconditional}$, return RSR or withdrawal L-EXCEPT.

On a positive response to test 305, the verification process proceeds to reupdate the type stack, at a step 308, with an exception types entry, marked EXCEPT type, step 308 being followed by a context continuation step, continue C. On a negative response to test 305, the verification process fails with the step marked Failure. The program fragment is then rejected.

With reference to FIG. 3f, when the current instruction $I_i$ is the target of multiple incompatible branches, this condition is implemented by a test 309, which is marked:

$I_i$=incompatible XIBs the incompatible branches being, for instance, an unconditional branch and a subroutine call, or even two different exception handlers. On a positive response to test 309, the branches being incompatible, the verification process fails with a step marked Failure and the program fragment is rejected. On a negative response to test 309, the verification process is continued with a step marked continue D. Test 309 begins with the continue C step mentioned previously in the description.

With reference to FIG. 3g, when the current instruction $I_i$ is not the target of any branch, this condition being implemented by a test 310 beginning with the abovementioned continue D, this test being marked $I_i$ ∃? branch targets, where ∃ denotes the existence symbol, the verification process continues on a negative response to the test 310 by going on to an update of the type stack at step 311, step 311 and the positive response to test 310 being followed by a context continuation step at step 202, which is described above in the description with reference to FIG. 3a.

A more detailed description of the step for verifying the effect of the current instruction on the type stack at the abovementioned step 202 will now be given with reference to FIG. 3h.

According to the abovementioned figure, this step can include at least one step 400 for verifying that the type execution stack contains at least as many entries as the current instruction includes operands. This test step 400 is marked:

Nbep≧NOpi where Nbep denotes the number of type stack entries and NOpi denotes the number of operands contained in the current instruction.

On a positive response to test 400, this test is followed by a step 401a for unstacking the type stack, and for verifying 401b that the types of the entries at the top of the stack are subtypes of the types of the operands of the abovementioned current instruction. At test step 401a, the operand types of the instruction i are marked TOpi, and the types of the entries at the top of the stack are marked Targs.

At step 401b, the verification corresponds to a verification of the subtyping relation Targs subtype of TOpi.

On a negative response to tests 400 and 401b, the verification process fails, which is shown by access to the Failure step. On the other hand, on a positive response to test 401b, the verification process is continued, and consists in carrying out:

A step for verifying the existence of a sufficient memory space on the type stack to proceed to stack the results of the current instruction. This verification step is implemented by a test 402, marked:

Stack-space≧Results-space where each side of the inequality denotes the corresponding memory space.

On a negative response to test 402, the verification process fails, which is shown by the Failure step. On the other hand, on a positive response to test 402, the verification process then proceeds to stack the data types assigned to the results in a step 403, the stacking being done on the data types stack assigned to these results.

As a nonlimiting example, it is indicated that to implement FIG. 3h for verifying the effect of the current instruction on the type stack, for a current instruction consisting of a JAVA saload instruction corresponding to reading an integer element coded on p=16 bits in an integer array, this integer array being defined by the integer array and an integer index in this array, and the result by the integer which is read at this index in this array, the verification process checks that the type stack contains at least two elements, that the two elements at the top of the type stack are subtypes of short[ ] and short respectively, proceeds to the unstacking process and then to the process of stacking the data type short as the result type.

Additionally, with reference to FIG. 3i, to implement the step for verifying the effect of the current instruction on the type stack, when the current instruction $I_i$ is a read instruction, marked IR, of a register of address n, this condition being implemented by a test 404 marked $I_i$=IR$_n$, on a positive response to the abovementioned test 404, the verification process consists in verifying the data type of the result of this read, in a step 405, by reading the entry n in the register type array, then in determining the effect of the current instruction $I_i$ on the type stack by an operation 406a of unstacking the entries of the stack corresponding to the operands of this current instruction and by stacking 406b the data type of this result. The operands of the instruction $I_i$ are marked OP$_i$. Steps 406a and 406b are followed by a return to the context continuation, continue F. On a negative response to test 404, the verification process is continued by the context continuation, continue F.

With reference to FIG. 3j, when the current instruction $I_i$ is a write instruction, marked IW, of a register of address n, this condition being implemented by a test marked $I_i$=IW$_n$, on a positive response to test 407, the verification process consists in determining, in a step 408, the effect of the current instruction on the type stack and the type t of the operand written in the register of address n, then, in a step 409, in replacing the type entry of the register type array at address n with the type immediately above the previously stored type and above the type t of the operand written in the register of address n. Step 409 is followed by a return to the context continuation, continue 204. On a negative response to test 407, the verification process is continued by a context continuation, continue 204.

As an example, when the current instruction $I_i$ corresponds to writing a value of type D into a register of address 1, and the type of register 1 before verification of the instruction was C, the type of register 1 is replaced by the type object, which is the smallest type higher than C and D in the lattice of types shown in FIG. 3b.

In the same way, as an example, when the current instruction $I_i$ is a read of an instruction aload-0 consisting in stacking the content of register 0, and entry 0 of the register type array is C, the verifier stacks C onto the type stack.

An example of verifying a subroutine written in a JAVA environment will now be given, with reference to tables T3 and T4 in the annex.

Array T3 represents a specific JAVACARD code corresponding to the Java subroutine included in this array.

Array T4 shows the content of the register type array and of the type stack before verification of each instruction. The type constraints on the operands of the various instructions are all observed. The stack is empty both after the instruction 5 to branch to instruction 9, symbolized by the arrow, and before the abovementioned branch target 9. The type of register 1, which was initially ⊥, becomes null, the upper bound of null and ⊥, when instruction 1 to store a value of type null in register 1 is examined, then becomes of type short[ ], the upper bound of types short[ ] and null, when instruction 8 to store a value of type short[ ] in register 1 is processed. Since the type of register 1 has changed during the first verification pass, a second pass is carried out, this time starting from the register types obtained at the end of the first. This second verification pass is successful, just like the first, and does not change the register types. The verification process thus terminates successfully.

Various examples of cases of failure of the verification process on four examples of incorrect code will now be given with reference to array T5 in the annex:

At point a) of array T5, the purpose of the code given as an example is to attempt to construct an invalid object reference using an arithmetic process on pointers. It is rejected by verification of the types of arguments of instruction 2 sadd, which requires these two arguments to be of type short.

At points b) and c) of array T5, the purpose of the code is to carry out two attempts to convert any integer into an object reference. At point b), register 0 is used simultaneously with type short, instruction 0, and with type null, instruction 5. Consequently, the verification process assigns type T to register 0, and detects a type error when register 0 is returned as a result of type object at instruction 7.

At point c) of array T5, a set of branches of type "if . . . then . . . else . . . " is used to leave at the top of the stack a result which consists of either an integer or an object reference. The verification process rejects this code because it detects that the stack is not empty at the branch from instruction 5 to instruction 9, symbolized by the arrow.

Finally, at point d) of array 5, the code contains a loop which, on each iteration, has the effect of stacking an additional integer on the top of the stack, and thus causing a stack overflow after a certain number of iterations. The verification process rejects this code, observing that the stack is not empty at the backward branch from instruction 8 to instruction 0, symbolized by the return arrow, the stack not being empty at a branch point.

The various examples given above with reference to tables T3, T4 and T5 show that the verification process, which is the subject of the present invention, is particularly effective, and that it applies to applets, and in particular to subroutines thereof, for which the conditions of stack type, or respectively of the empty character of the type stack, previously on the branch or branch target instructions, are satisfied.

Obviously, such a verification process implies writing object codes which satisfy these criteria, these object codes possibly corresponding to the subroutine in the abovementioned array T3.

However, and in order to ensure the verification of existing applets and subroutines of applets which do not necessarily satisfy the verification criteria of the method which is the subject of the present invention, in particular regarding applets and subroutines written in the Java environment, the purpose of the present invention is to establish methods of transforming these applets or subroutines into standardized applets or program fragments that can successfully undergo the verification tests of the verification method which is the subject of the present invention and of the management process which implements such a method.

For this purpose, the subject of the invention is the implementation of a method and a program for transforming a conventional object code forming an applet, it being possible to implement this method and this transformation program outside an embedded system or microprocessor card when the relevant applet is created.

The method of transforming code into standardized code, which is the subject of the present invention, will now be described in the framework of the JAVA environment, as a purely illustrative example.

The JVM codes produced by existing JAVA compilers satisfy various criteria, which are stated below:
C1: the arguments of each instruction do belong to the types which this instruction expects;
C2: the stack does not overflow;
C'3: for each branch instruction, the type of the stack at this branch is the same as at the possible targets for this branch;
C'4: a value of type t written into a register at one point of the code and read back from the same register at another point of the code is always read back with the same type t;

The implementation of the verification method which is the subject of the present invention entails criteria C'3 and C'4, verified by the object code submitted for verification, being replaced by criteria C3 and C4 below:
C3: the stack is empty at each branch instruction and at each branch target;
C4: the same register is used with one and the same type throughout the code of a subroutine.

With reference to the abovementioned criteria, it is indicated that Java compilers guarantee only the weaker criteria C'3 and C'4. The verification process which is the subject of the present invention and the corresponding management process in fact guarantee more restrictive criteria C3 and C4, making it possible to ensure the security of execution and management of applets.

The concept of standardization, covering the transformation of codes into standardized codes, can present various aspects, inasmuch as the replacement of criteria C'3 and C'4 by criteria C3 and C4, in accordance with the verification process which is the subject of the present invention, can be implemented separately, to ensure that the stack is empty at each branch instruction and at each branch target, and respectively that the registers which the applet opens are typed, and a single data type which is assigned for execution of the relevant applet corresponds to each open register, or, on the other hand, jointly, to satisfy the whole of the verification process which is the subject of the present invention.

The method of transforming an object code into standardized object code according to the invention will consequently be described according to two distinct embodiments, a first embodiment corresponding to the transformation of an object code which satisfies criteria C1, C2, C'3, C'4 into a standardized object code which satisfies criteria C1, C2, C3, C'4 corresponding to a standardized code with an empty branch instruction or branch target, then, according to a second embodiment, in which the conventional object code which satisfies the same initial criteria is transformed into a standardized object code which satisfies criteria C1, C2, C'3, C4, for instance corresponding to a standardized code using typed registers.

The first embodiment of the code transformation method which is the subject of the present invention will now be described with reference to FIG. 4a. In the embodiment shown in FIG. 4a, the initial conventional code is considered to satisfy criteria C1+C2+C'3, and the standardized code obtained as the result of the transformation is considered to satisfy criteria C1+C2+C3.

According to the abovementioned figure, the transformation method consists, for each current instruction $I_i$ of the code or of the subroutine, in annotating each instruction, in a step 500, with the data type of the stack before and after execution of this instruction. The annotation data is marked $AI_i$ and is associated by the relation in the relevant current instruction. The annotation data is calculated by means of an analysis of the data stream relating to this instruction. The data types before and after execution of the instruction are marked $tbe_i$ and $tae_i$ respectively. Calculation of annotation data by analysis of the data stream is a conventional calculation known to those skilled in the art, and will therefore not be described in detail.

The operation carried out at step 500 is illustrated in array T6 in the annex, in which, for an applet or applet subroutine including 12 instructions, the annotation data $AI_i$ made up of the types of registers and the types of the stack is introduced.

The abovementioned step 500 is then followed by a step 500*a* consisting in positioning the index i on the first instruction $I_i=I_1$. Step 500*a* is followed by a step 501 consisting in detecting, among the instructions and in each current instruction $I_i$, the existence of branches marked IB or of branch targets CIB for which the execution stack is not empty. This detection 501 is implemented by a test which is carried out on the basis of the annotation data $AI_i$ of the type of stack variables allocated to each current instruction, the test being marked for the current instruction:

$I_i$ is an IB or CIB and stack $(AI) \neq$ empty.

On a positive response to test 501, i.e. in the presence of detection of a non-empty execution stack, the abovementioned test is followed by a step consisting in inserting instructions to transfer stack variables on either side of these branches IB or branch targets CIB, in order to empty the content of the execution stack into temporary registers before this branch and to reestablish the execution stack from the temporary registers after this branch. The insertion step is marked 502 in FIG. 4a. It is followed by a step 503 to test the reaching of the last instruction, marked $I_i$=last instruction?

On a negative response to test 503, an increment 504 i=i+1 is carried out, to go on to the next instruction and return to step 501. On a positive response to test 503, an End step is initiated. On a negative response to test 501, the transformation method is continued by a branch to step 503 in the absence of insertion of a transfer instruction. The implementation of the method of transforming a conventional code into a standardized code with branch instruction with empty stack as represented in FIG. 4a makes it possible to obtain a standardized object code for the same initial program fragment in which the stack of stack variables is empty at each branch instruction and each branch target instruction, in the absence of any modification to the execution of the program fragment. In the case of a Java environment, the instructions to transfer data between stack and register are the load and store instructions of the Java virtual machine.

Returning to the example introduced in array T6, the transformation method detects a branch target where the stack is not empty at instruction 9. An instruction istore 1 is then inserted before the branch instruction 5 which leads to the abovementioned instruction 9, in order to save the content of the stack in register 1 and ensure that the stack is empty at the time of the branch. Symmetrically, an instruction iload 1 is inserted before the instruction target 9, to reestablish the content of the stack exactly as it was before the branch. Finally, an instruction istore 1 is inserted after instruction 8 to ensure that the stack is balanced on the two paths which lead to instruction 9. The result of the transformation carried out in this way into a standardized code is shown in array T7.

The second embodiment of the transformation method which is the subject of the present invention will now be described with reference to FIG. 4b in the case in which the initial conventional object code satisfies criteria C1+C'4 and the standardized object code satisfies criteria C1+C4.

Figure 4A:
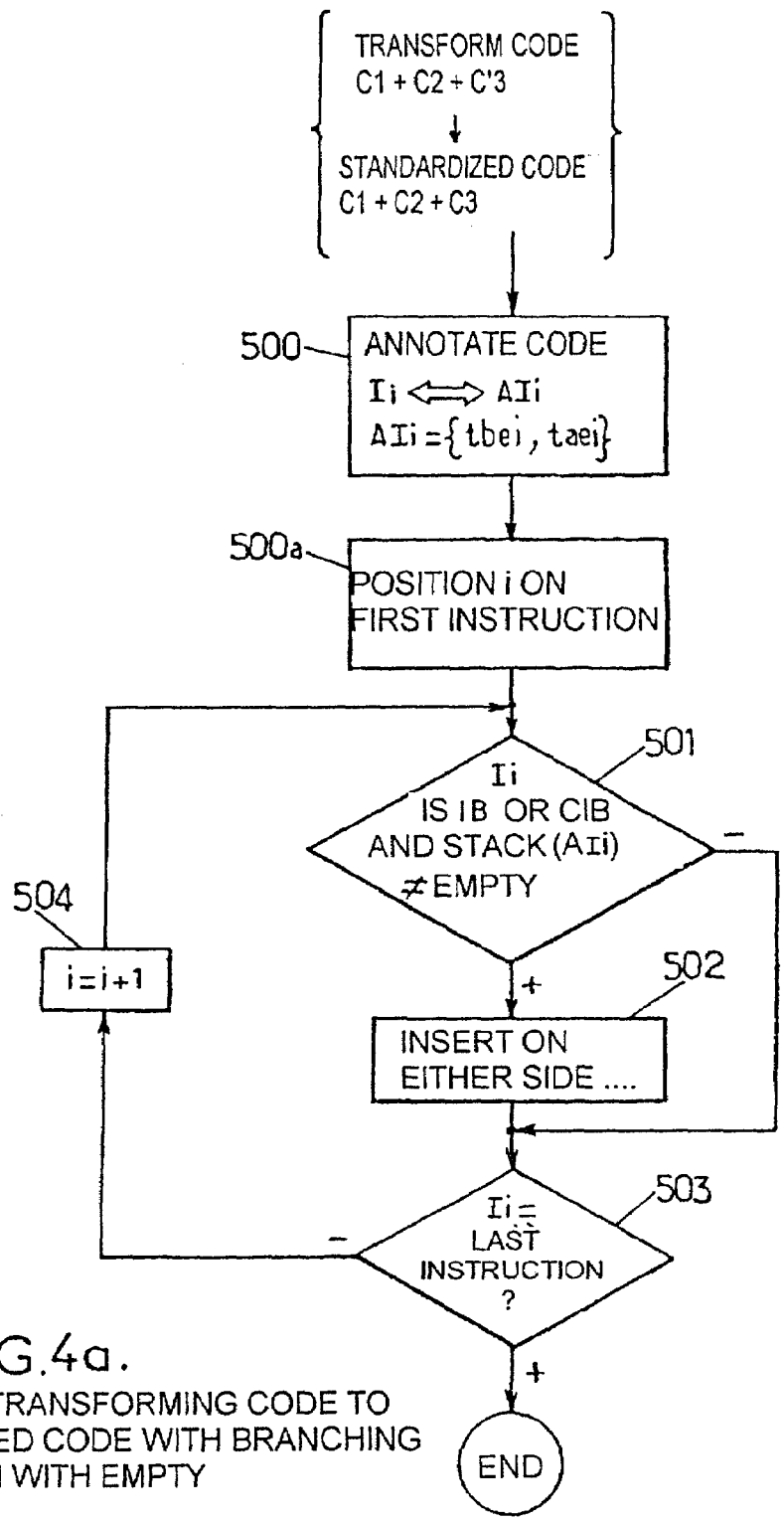
FIG. 4*a* represents a flow chart illustrating a method of transforming an object code of a program fragment into a standardized object code for this same program fragment with a branch instruction, respectively a branch-target instruction, with an empty stack.

With reference to the abovementioned FIG. 4b, it is indicated that the method, in this embodiment, consists in annotating, according to a step 500 which is approximately the same as that shown in FIG. 4a, each current instruction $I_i$ with the data type of the registers before and after execution of this instruction. In the same way, the annotation data $AI_i$ is calculated by means of an analysis of the data stream relating to this instruction.

The annotation step 500 is then followed by a step consisting in carrying out a reallocation of the registers, the step marked 601, by detecting the original registers employed with different types, and dividing these original registers into separate standardized registers, one standardized register being allocated to each data type used. Step 601 is followed by a step 602 for reupdating the instructions which manipulate the operands which use the abovementioned standardized registers. Step 602 is followed by a context continuation step 302.

With reference to the example given in array T6, it is indicated that the transformation method detects that the register of rank 0, marked r0, is used with the two types, object, instructions 0 and 1, and int, instruction 9 and following. The original register r0 is then divided into two registers, register 0 for the use of object types and register 1 for uses of int type. References to register 0 of int type are then rewritten by transforming them into references to register 1, the standardized code obtained being shown in array T8 in the annex.

It is noted, in a nonlimiting way, that in the example introduced with reference to the abovementioned array T8, the new register 1 is used simultaneously for standardization of the stack and for the creation of typed registers by dividing of register 0 into two registers.

The method of transforming a conventional code into a standardized code with branch instruction with empty stack as described in FIG. 4a will now be described in more detail in a preferred, nonlimiting embodiment, in relation to FIG. 5*a*.

This embodiment concerns step 501, consisting in detecting, within the instructions and within each current instruction $I_i$, the existence of branch IB, or respectively of branch target CIB, for which the stack is not empty.

Following the determination of target instructions where the stack is not empty, this condition being marked at step 504*a*, $I_i$ stack≠empty, the transformation process consists in associating with these instructions, at the abovementioned step 504*a*, a set of new registers, one for each stack location which is active at these instructions. Thus, if i denotes the rank of a branch target of which the associated stack type is not empty and is of type $tp1_i$ to $tpn_i$ with n>0, stack not empty, the transformation process allocates n new, as yet unused, registers, $r_1$ to $r_n$, and associates them with the corresponding instruction i. This operation is implemented at step 504a.

Step 504a is followed by a step 504 consisting in examining each detected instruction of rank i and identifying, in a test step 504, the existence of a branch target CIB or of a branch IB. Step 504 is shown in the form of a test designated by:

∃?CIB, IB and $I_i$=CIB.

In the case where the instruction of rank i is a branch target CIB represented by the preceding equality, and where the stack of stack variables at this instruction is not empty, i.e. with a positive response to test 504, for any preceding instruction of rank i–1 consisting of a branch, a withdrawal of an exception or a program return, this condition is implemented at test step 505, designated by:

$I_{i-1}$=IB, EXCEPT withdrawal, Prog, return.

The detected instruction of rank i is only accessible by a branch. On a positive response to the abovementioned test 505, the transformation process consists in carrying out a step 506 consisting in inserting a set of load instructions of load type from the set of new registers before the relevant detected instruction of rank i. The insertion operation 506 is followed by a redirection 507 of all branches to the detected instruction of rank i, to the first inserted load instruction load. The insertion and redirection operations are shown in array T9 in the annex.

For any preceding instruction of rank i–1 continuing in sequence, i.e. when the current instruction of rank i is accessible simultaneously by a branch and from the preceding instruction, this condition being implemented by test 508 and symbolized by the relations:

$I_{i-1} \rightarrow I_i$ and

IB$\rightarrow I_i$ the transformation process consists, in a step 509, in inserting a set of store instructions to save to the set of new registers before the detected instruction of rank i, and a set of load instructions to load from this set of new registers. Step 509 is then followed by a step 510 for redirecting all the branches to the detected instruction of rank i to the first inserted load instruction.

Figure 5A:
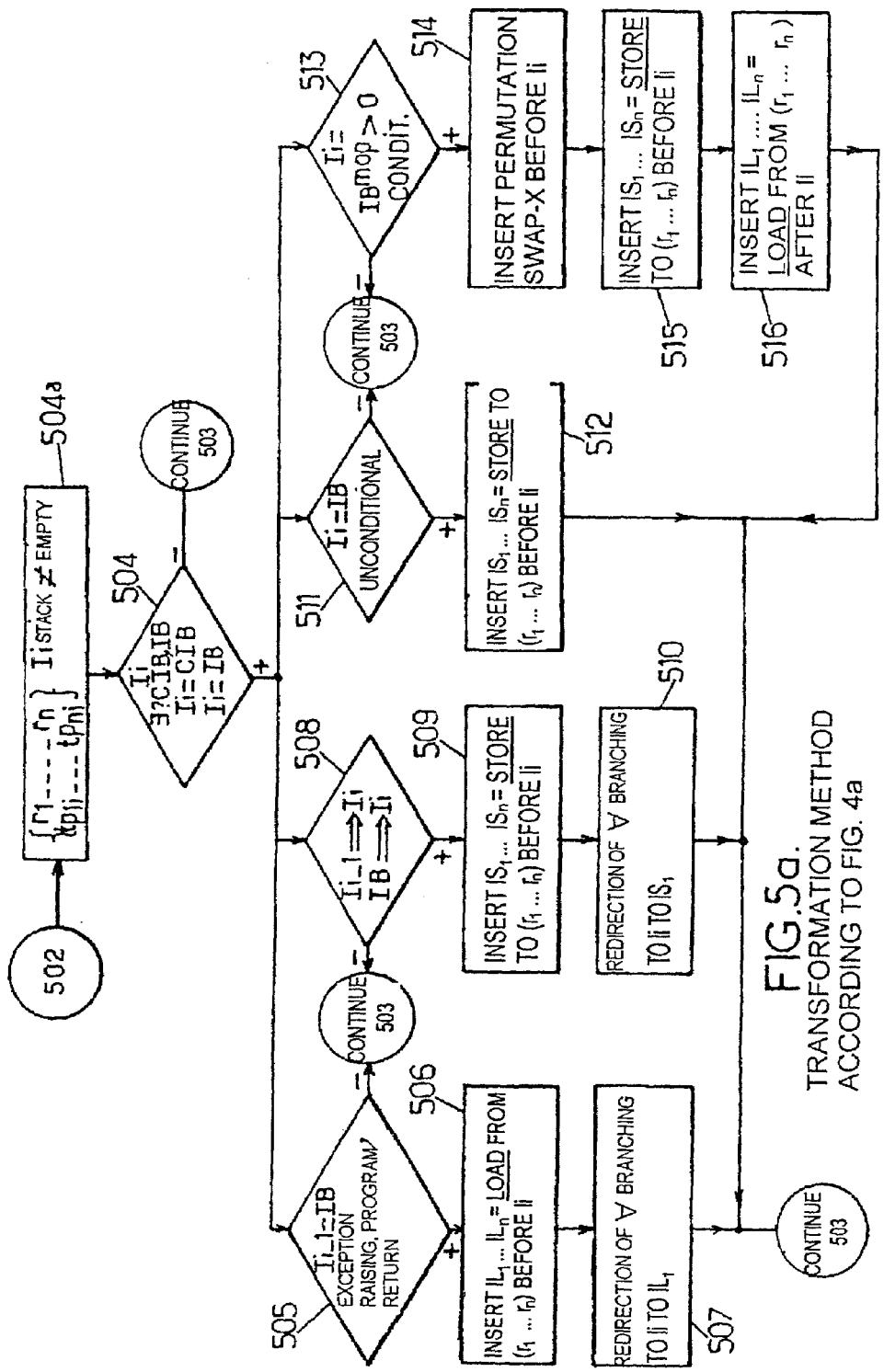
FIG. 5*a* represents a detail of implementation of the transformation method illustrated in FIG. 4*a*.

In the case where the detected instruction of rank i is a branch to a determined instruction, for any detected instruction of rank i consisting of an unconditional branch, this condition being implemented by a test 511 marked:

$I_i$=IB$_{uncondit.}$ the transformation process as shown in FIG. 5a consists in inserting at a step 512, on a positive response to test 511, before the detected instruction of rank i, multiple store instructions. The transformation process inserts before the instruction i the n store instructions as shown in array T11 as an example. The store instructions address registers $r_1$ to $r_n$, where n denotes the number of registers. Thus the store instruction is associated with each new register.

For every detected instruction of rank i consisting of a conditional branch, and for a number mOp, greater than 0, of operands manipulated by this conditional branch instruction, this condition being implemented by the test 513 marked:

$I_i$=IB$_{condit.}$
with mOp>0 the transformation process, on a positive response to the abovementioned test 513, consists of inserting, at a step 514 before this detected instruction of rank i, a swap instruction marked swap_x at the top of the stack of stack variables of the mOp operands of the detected instruction of rank i and the n following values. This swap operation makes it possible to collect at the top of the stack of stack variables the n values to be stored in the set of new registers $r_1$ to $r_n$. Step 514 is followed by a step 515 consisting in inserting, before the instruction of rank i, a set of store instructions to save to the set of new registers $r_1$ to $r_n$. The abovementioned insertion step 515 is itself followed by a step 516 for insertion, after the detected instruction of rank i, of a set of load instructions to load from the set of new registers $r_1$ to $r_n$. The set of corresponding insertion operations is shown in array 12 in the annex.

For reasons of completeness and with reference to FIG. 5a, it is indicated that, on a negative response to test 504, the continuation of the transformation process is implemented by a context continuation step, continue 503, that the negative response to tests 505, 508, 511 and 513 is itself followed by a continuation of the transformation process via a context continuation step, continue 503, and that the same applies to the continuation of operations after the abovementioned redirection steps 507 and 510 and insertion steps 512 and 516.

A more detailed description of the method of standardizing and transforming an object code into a standardized object code using typed registers as described in FIG. 4b will now be given with reference to FIG. 5b. This embodiment concerns, more particularly, a nonlimiting, preferred embodiment of step 601 for reallocating the registers by detecting the original registers used with different types.

Figure 5B:
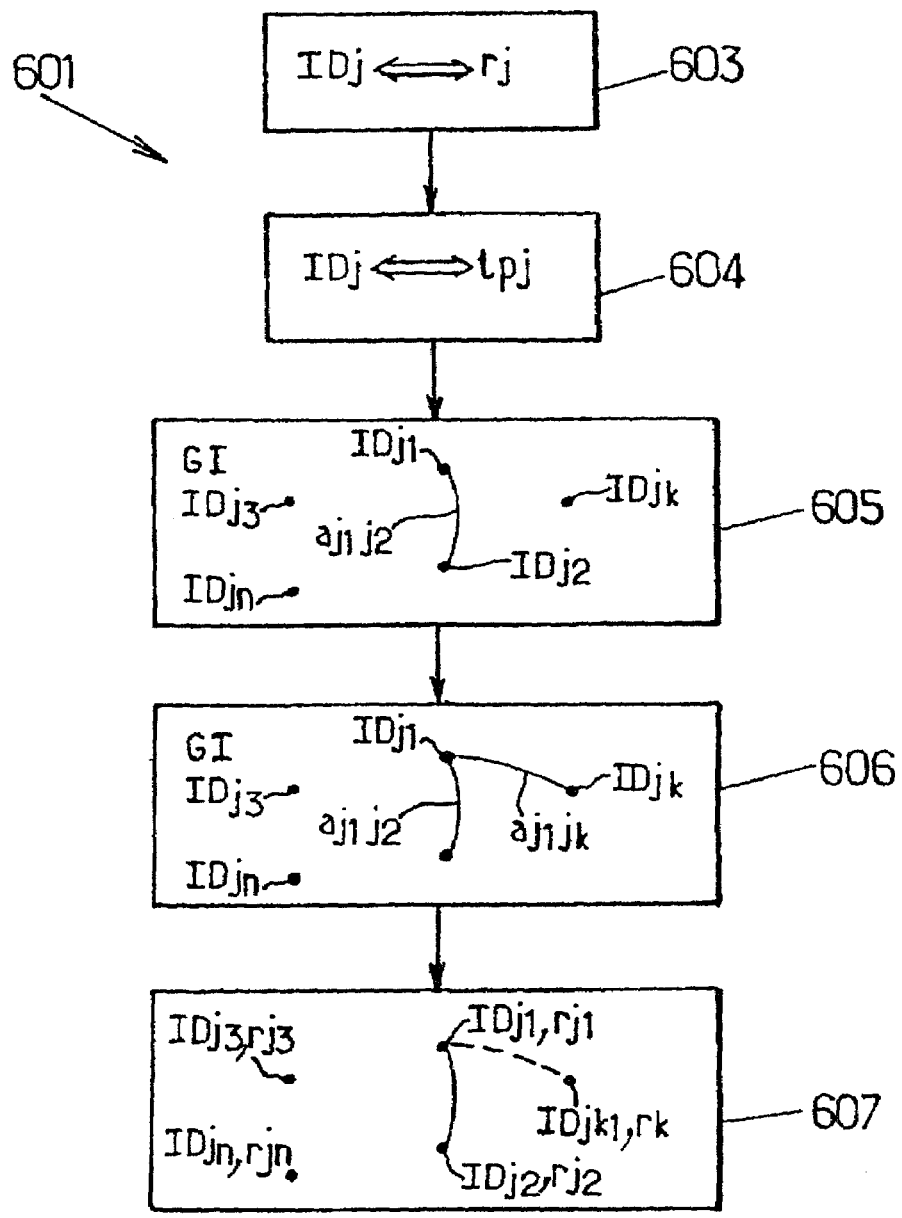
FIG. 5*b* represents a detail of implementation of the transformation method illustrated in FIG. 4*b*.

With reference to the abovementioned FIG. 5b, it is indicated that the abovementioned step 601 consists in determining, in a step 603, the lifetime intervals marked IDS of each register $r_j$. These lifetime intervals, called "live range" or "webs", are defined for a register r as a maximum set of partial traces such that register r is live at all points of these traces. For a more detailed definition of these concepts, it is useful to refer to the work edited by Steven S. MUCHNICK entitled "Advanced Compiler Design and Implementation", Section 16.3, Morgan KAUFMANN, 1997. Step 603 is designated by the relation:

$ID_j \leftarrow\!\!\rightarrow r_j$ according to which a corresponding lifetime interval IDS is associated with each register $r_j$.

The abovementioned step 603 is followed by a step 604 consisting in determining, at step 604, the main data type, marked $tp_j$, of each lifetime interval $ID_j$. The main type of a lifetime interval $ID_j$, for a register $r_j$, is defined by the upper bound of the data types stored in this register $r_j$ by the store instructions belonging to the abovementioned lifetime interval.

Step 604 is itself followed by a step 605 consisting in establishing an interference graph between the lifetime intervals as defined above at steps 603 and 604, this interference graph consisting of a non-oriented graph of which each peak consists of a lifetime interval, and of which the arcs, marked $a_{j1,j2}$ on FIG. 5b, between two peaks $ID_{j1}$ and $ID_{j2}$, exist if a peak contains a store instruction addressed to the register of the other peak or vice versa. In FIG. 5b, the construction of the interference graph is shown symbolically, it being possible to implement this construction on the basis of calculation techniques known to those skilled in the art. For a more detailed description of the construction of this type of graph, it is useful to refer to the work published by Alfred V. AHO, Ravi SETHI and Jeffrey D. ULLMAN entitled "Compilers: principles, techniques, and tools", Addison-Wesley 1986, Section 9.7.

Following step 605, the standardization method as shown in FIG. 5b consists in translating, in a step 606, the uniqueness of a data type allocated to each register $r_j$ in the interference graph, by adding arcs between all pairs of peaks of the interference graph while two peaks of a pair of peaks do not have the same associated main data type. It is understood that the translation of the uniqueness character of a data type which is allocated to each register obviously corresponds to the translation and recognition criterion C4 in the interference graph, this criterion being mentioned previously in the description. The abovementioned step 606 is then followed by a step 607 in which an instantiation of the interference graph is carried out, this instantiation being more commonly known as the coloring step of the interference graph according to the usual techniques. During step 607, the transformation process assigns to each lifetime interval $ID_{jk}$ a register number rk, in such a way that two adjacent intervals in the interference graph receive different register numbers.

This operation can be implemented on the basis of any suitable process. As a nonlimiting example, it is indicated that a preferred process can consist:

a) in choosing a peak of minimum degree in the interference graph, minimum degree being defined as a minimum number of adjacent peaks, and removing it from the graph. This step can be repeated until the graph is empty.

b) Each previously removed peak is reintroduced into the interference graph in the reverse order of their removal, the last to be removed being the first to be reintroduced, and successively in the reverse order of the order of removal. Thus the smallest register number which is different from the numbers assigned to all the adjacent peaks can be assigned to each reintroduced peak.

Finally, by step 602, shown in FIG. 4b, the transformation and reallocation process rewrites the register access instructions in the code of the subroutine of the relevant applet. Access to a given register in the corresponding lifetime interval is replaced by access to a different register, the number of which has been assigned during the instantiation phase, also designated the coloring phase.

A more detailed description of an embedded data-processing system for implementing the management process and verification process of a program fragment or applet in accordance with the subject of the present invention, and of a development system of an applet, will now be given with reference to FIG. 6.

Figure 1B:
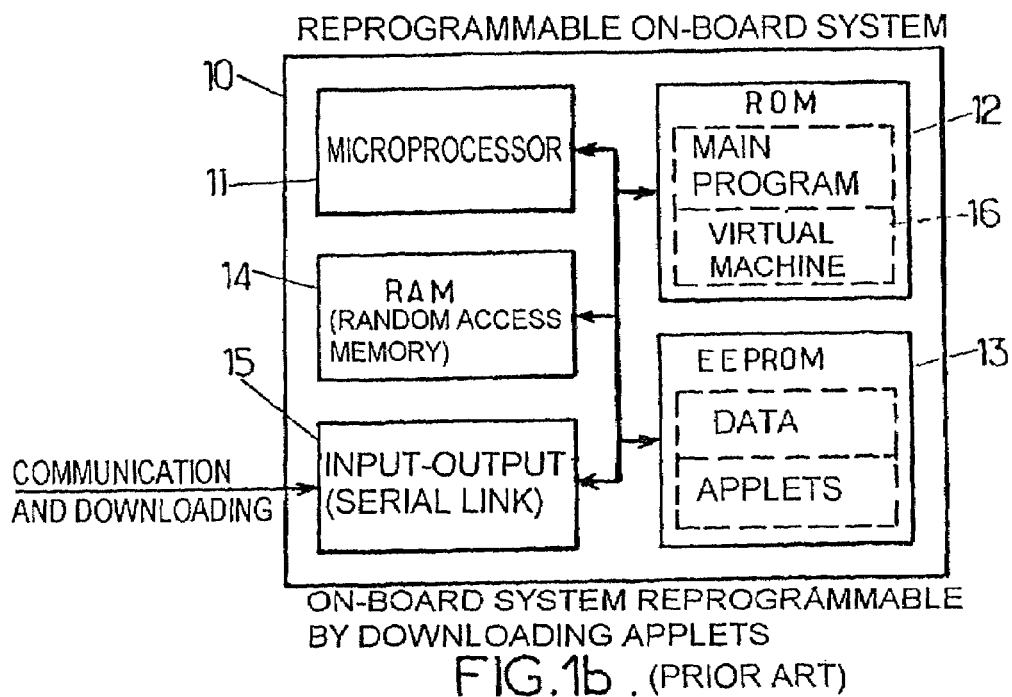
FIG. 1b represents the architecture of a prior art reprogrammable embedded system.

Regarding the corresponding embedded system with reference 10, it is recalled that this embedded system is a reprogrammable-type system, including the essential components as shown in FIG. 1b. The abovementioned embedded system is considered to be interconnected to a terminal by a serial link, the terminal itself being linked, for instance via a local area network, if appropriate a wide area network, to an applet development computer with reference 20. On the embedded system 10, a main program runs which reads and executes the commands sent by the terminal over the serial link. Additionally, the standard commands for a microprocessor card, such as for instance the standard commands of the ISO 7816 protocol, can be implemented, the main program recognizing two additional commands, one for downloading an applet, and the other for selecting an applet which has previously been loaded onto the microprocessor card.

In accordance with the subject of the present invention, the structure of the main program is implemented in such a way as to include at least one program module for management and verification of a downloaded program fragment according to the process for managing a downloaded program fragment as described above in the description with reference to FIG. 2.

Additionally, the program module also includes a subroutine module to verify a downloaded program fragment according to the verification method as described above in the description with reference to FIGS. 3a to 3j.

For this purpose, the structure of the memories, in particular the non-writable permanent memory ROM, is modified in such a way as to include in particular, in addition to the main program, a process management and verification module 17 and a virtual machine 16 for interpreting the software code, as mentioned above. Finally, regarding the nonvolatile rewritable memory of EEPROM type, this advantageously includes a directory of applets, marked 18, for implementing the management process and the verification process which are the subjects of the present invention.

Figure 6:
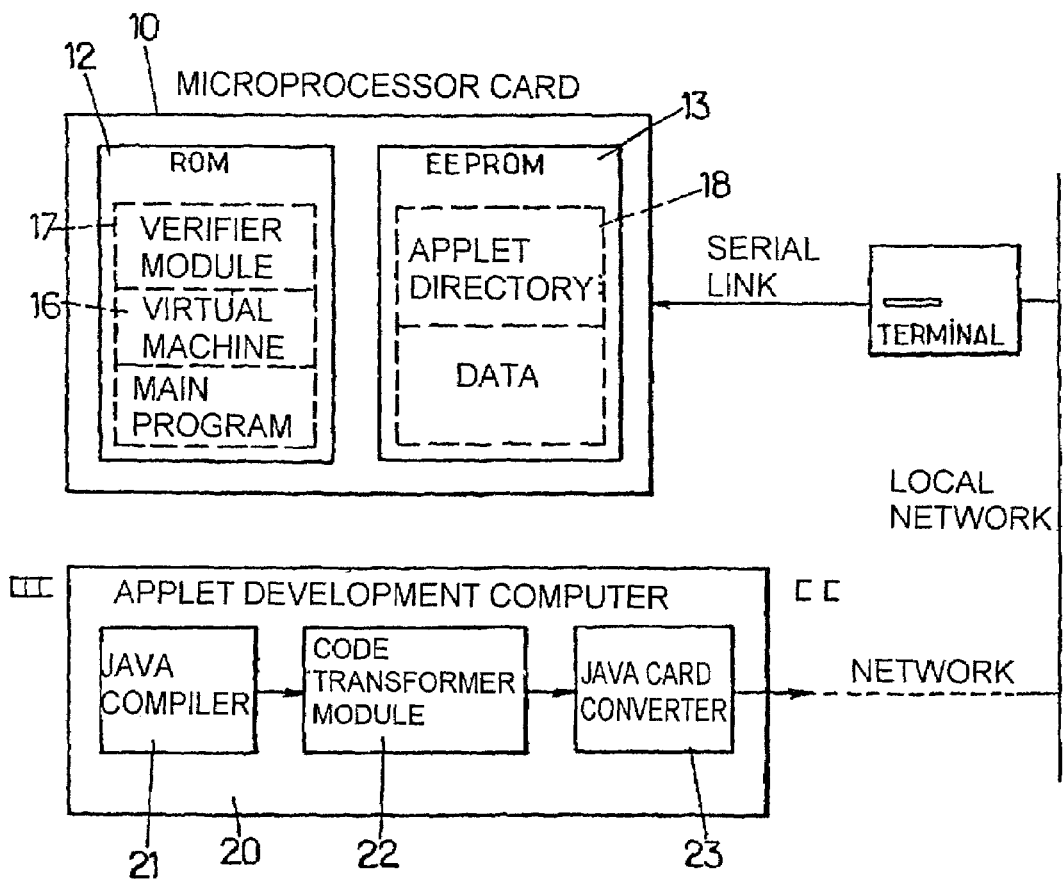
FIG. 6 represents a functional diagram of the complete architecture of a system for developing a standardized program fragment, and of a reprogrammable microprocessor card used to implement the process for managing and the method of verifying a program fragment in accordance with the subject of the present invention.

With reference to the same FIG. 6, it is indicated that the applet development system conforming to the subject of the present invention, in fact for transforming a conventional object code as mentioned above in the description, and satisfying criteria C1+C2+C'3+C'4 in the framework of the Java environment, into a standardized object code for the same program fragment, includes, associated with a conventional Java compiler 21, a code transformation module, marked 22, which proceeds to transform code into standardized code according to the first and second embodiments described above in the description with reference to FIGS. 4a, 4b and 5a, 5b. It is in fact understood that, on the one hand, standardization of the original object code into a standardized object code with branch instruction with empty stack and into a standardized code using typed registers, on the other hand, as mentioned previously in the description, makes it possible to satisfy verification criteria C3 and C4 imposed by the verification method which is the subject of the present invention.

The code transformation module 22 is followed by a JAVACARD converter 23, which makes it possible to transmit via a wide area or local area network to the terminal and, via the serial link, to the microprocessor card 10. Thus the applet development system 20 shown in FIG. 6 is used to transform the compiled class files produced by the Java compiler 21 from the JAVA source codes of the applet into class files which are equivalent, but which observe the additional constraints C3, C4 imposed by the management process and the verification module 17 embedded on the microprocessor card 10. These transformed class files are converted into an applet which can be downloaded to the card by the standard JAVACARD converter 23.

Various particularly noteworthy components of the set of process components, methods and systems which are the subjects of the present invention will now be given for information only.

Compared to the verification processes of the prior art as mentioned in the introduction to the description, the verification method which is the subject of the present invention appears noteworthy in that it concentrates the verification effort on the typing properties of the operands which are essential to the security of execution of each applet, i.e. observing the type constraints associated with each instruction and absence of stack overflow. Other verifications do not appear to be essential in terms of security, in particular verification that the code correctly initializes every register before reading it for the first time. On the contrary, the verification method which is the subject of the present invention operates by initializing to zero all the registers from the virtual machine when the method is initialized, to guarantee that reading a non-initialized register cannot compromise the security of the card.

Additionally, the requirement imposed by the verification method which is the subject of the present invention, according to which the stack must be empty at each branch or branch target instruction, ensures that the stack is in the same state, empty, after execution of the branch and before execution of the instruction to which the program has branched. This procedure ensures that the stack is in a consistent state, whatever the execution path which is followed through the code of the relevant subroutine or applet. The consistency of the stack is thus guaranteed even in the presence of a branch or branch target. Contrary to the methods and systems of the prior art, in which it is necessary to retain in random-access memory the type of the stack at each branch target, which necessitates a quantity of random-access memory proportional to Tp×Nb, the product of the maximum size of execution stack used and the number of branch targets in the code, the verification method which is the subject of the present invention only needs the type of the execution stack at the time of the instruction during verification, and it does not keep in memory the type of this stack at other points of the code. Consequently, the method which is the subject of the invention is satisfied with a quantity of random-access memory proportional to Tp but independent of Nb, and consequently of the length of the code of the subroutine or applet.

The requirement according to criterion C4, according to which a given register must be used with one and the same type throughout the code of a subroutine, ensures that the abovementioned code does not use a register in an inconsistent way, e.g. by writing a short integer to it at one point of the program and rereading it as an object reference at another point of the program.

In the verification processes described in the prior art, in particular in the previously mentioned Java specification entitled "The Java Virtual Machine Specification", edited by Tim LINDHOLM and Frank YELLIN, to guarantee the consistency of the abovementioned uses through the branch instructions, it is necessary to keep in random-access memory a copy of the register type array at each branch target. This operation necessitates a quantity of random-access memory proportional to $T_r \times N_b$, where $T_r$ denotes the number of registers used by the subroutine and $N_b$ the number of branch targets in the code of this subroutine.

On the contrary, the verification process which is the subject of the present invention operates on a global register type array without keeping a copy at different points of the code in random-access memory. Consequently, the random-access memory required to implement the verification process is proportional to $T_r$ but independent of $N_b$, and consequently of the length of the code of the relevant subroutine.

The constraint according to which a given register is used with the same type at all points, i.e. at every instruction of the relevant code, simplifies appreciably and significantly the verification of subroutines. On the contrary, in the verification processes of the prior art, in the absence of such a constraint, the verification process must establish that the subroutines observe a strict stack discipline, and must verify the body of the subroutines polymorphously regarding the type of certain registers.

In conclusion, the verification process which is the subject of the present invention, compared to the techniques of the prior art, makes it possible, on the one hand, to reduce the size of the code of the program for carrying out the verification method, and on the other hand, to reduce the consumption of random-access memory during the verification operations, the degree of complexity being of the form $O(T_p + P_r)$ in the case of the verification process which is the subject of the present invention, instead of $(O(T_p + T_r) \times N_b)$ for the verification process of the prior art, while however offering the same guarantees regarding the security of execution of the verified code.

Finally, the process of transforming original conventional code into standardized code is implemented by localized transformation of the code without transmitting additional information to the verifier component, i.e. the microprocessor card or embedded data-processing system.

Regarding the method of reallocating registers as described in FIGS. 4b and 5b, this method differs from the known methods of the prior art, as described in particular in U.S. Pat. Nos. 4,571,678 and 5,249,295, by the fact that:

the register reallocation ensures that the same register cannot be assigned to two intervals with different main types, which thus ensures that a given register is used with the same type throughout the code; and the existing register allocation algorithms, which are described in the above-mentioned documents, assume a fixed number of registers, and attempt to minimize the transfers, called "spills", between registers and stack, whereas reallocation of registers in accordance with the subject of the present invention operates in a framework where the total number of registers is variable, as a consequence of which there is no purpose in carrying out transfers between registers and stacks when a process of minimizing the total number of registers is implemented.

The process for managing a program fragment downloaded to an embedded system, and the methods of verifying this downloaded program fragment and respectively of transforming this object code of a downloaded program fragment, which are the subjects of the present invention, can of course be implemented by software.

Therefore, the present invention also concerns a computer program product which can be loaded directly into the internal memory of a reprogrammable embedded system, this embedded system making it possible to download a program fragment consisting of an object code, a series of instructions, executable by the microprocessor of the embedded system by means of a virtual machine provided with an execution stack and with local registers or variables manipulated by these instructions so that this object code can be interpreted. The corresponding computer program product includes portions of object code to execute the process for managing a program fragment downloaded to this embedded system, as shown in FIGS. 2 and 6 described above in the description, when this embedded system is interconnected with a terminal and this program is executed by the microprocessor of this embedded system by means of the virtual machine.

The invention also concerns a computer program product which can be loaded directly into the internal memory of a reprogrammable embedded system, such as a microprocessor card with a rewritable memory, as shown with reference to FIG. 6. This computer program product includes portions of object code to execute the steps for verifying a program fragment downloaded to this embedded system, as shown and described above in the description, with reference to FIGS. 3a to 3j. This verification is executed when this embedded system is interconnected with a terminal and this program is executed by the microprocessor of this embedded system by means of the virtual machine.

The invention also concerns a computer program product; this computer program product includes portions of object code to execute the steps of the method of transforming the object code of a program fragment into standardized object code for this same program fragment, as shown in FIGS. 4a, 4b, 5a, 5b and 6, and described above in the description.

The present invention also concerns a computer program product which is stored on a medium which can be used in a reprogrammable embedded system, e.g. a microprocessor provided with a rewritable memory, this embedded system being used to download a program fragment consisting of an object code executable by this microprocessor, by means of a virtual machine provided with an execution stack and local variables or registers manipulated by these instructions, to enable interpretation of this object code. The abovementioned computer program product includes, at least, a module of programs which can be read by the microprocessor of the embedded system by means of the virtual machine, to control the execution of a procedure for managing the downloading of a downloaded program fragment, as shown in FIG. 2 and described above in the description, a module of programs which can be read by the microprocessor by means of the virtual machine, to control the execution of a procedure for verifying, instruction by instruction, the object code which makes up this program fragment, as shown and described in relation to FIGS. 3a to 3j in the description above, and a module of programs which can be read by the microprocessor of this embedded system by means of the virtual machine, to control the execution of a downloaded program fragment following or in the absence of a transformation of the object code of this program fragment into a standardized object code for this same program fragment, as shown in FIG. 2.

The abovementioned computer program product also includes a module of programs which can be read by the microprocessor by means of the virtual machine, to control the inhibition of execution, on the embedded system, of the program fragment in the case of an unsuccessful verification procedure on the abovementioned program fragment, as shown and described above in the description with reference to FIG. 2.

What is claimed is:

1. A method of verifying a program fragment downloaded onto a reprogrammable embedded system, equipped with a rewritable memory, a microprocessor and a virtual machine equipped with an execution stack and with operand registers, said program fragment consisting of an object code and including at least one subprogram consisting of a series of instructions manipulating said operand registers, said microprocessor and virtual machine configured to interpret said object code, said embedded system being interconnected to a reader, wherein subsequent to a detection of a downloading command and a storage of said object code in said rewritable memory, said method, for each subprogram, comprises:

initializing a type stack and a table of register types through data representing a state of said virtual machine on initialization of an execution of said temporarily stored object code;

carrying out a verification process of said temporarily stored object code instruction by instruction, by discerning an existence, for each current instruction, of a target, a branching-instruction target, a target of an exception-handler call or a target of a subroutine call, and, said current instruction being a target of a branching instruction, said verification process including verifying that said type stack is empty and rejecting said program fragment otherwise;

verifying and updating an effect of said current instruction on the data types of said type stack and of said table of register types including:

verifying that said type stack includes at least as many entries as said current instruction includes operands;

unstacking and verifying that types of entries at the top of said stack are subtypes of the types of said operands of said current instruction; and stacking data types which are assigned to said results on said stack;

said verification process being successful when said table of register types is not modified in the course of a verification of all said instructions, and said verification process being carried out instruction by instruction until said table of register types is stable, with no modification having taken place, said verification process being interrupted and said program fragment being rejected, otherwise.

2. The method of claim 1, wherein the types which are manipulated during said verification process include at least:

class identifiers corresponding to object classes which are defined in said program fragment;

numeric variable types including at least a type for an integer coded on a given number of bits, designated as short type, and a type for the return address of a jump instruction, designated as a return address type;

references of null objects designated as null type;

object type relating to objects designated as object type;

a first specific type representing an intersection of all said types and corresponding to a zero value, designated as an intersection type;

a second specific type representing a union of all said types and corresponding to any type of value, designated as a union type.

3. The method of claim 2, wherein all said types obey a subtyping relation:

said object type is a subtype of said union type;

said short type and said return address type are subtypes of said union type; and said intersection type is a subtype of the null type, the short type and the return address type.

4. The method of claim 1, wherein said current instruction being a target of a subroutine call, said verification process comprising:

verifying that a previous instruction to said current instruction is an unconditional branching, a subroutine return or a withdrawal of an exception; and reupdating said type stack by an entity of the return address type, formed by the return address of said subroutine, in case of a positive verification process; and, rejecting said program fragment in case said verification process is failing, otherwise.

5. The method of claim 1, wherein said current instruction being a target of an exception handler, said verification process comprising:

verifying that a previous instruction to said current instruction is an unconditional branching, a subroutine return or a withdrawal of an exception; and reupdating said type stack, by entering an exception type, in case of a positive verification process; and rejecting said program fragment in case of said verification process is failing.

6. The method of claim 1, wherein said verification process fails and said program fragment is rejected if said current instruction is a target of multiple incompatible branchings.

7. The method of claim 1, wherein said verification process comprises continuing by passing to an update of said type stack if said current instruction is not a target of any branching.

8. The method of claim 1, wherein said verifying and updating includes:
  verifying an existence of a sufficient memory space on said type stack to proceed to stack the results of said current instruction.

9. The method of claim 8, wherein said current instruction being an instruction to read a register of a given address, said verification process comprises:
  verifying the data type of the result of a corresponding reading, by reading an entry at said given address in said table of register types;
  determining said effect of said current instruction on said type stack by unstacking the entries of said type stack corresponding to the operands of said current instruction and by stacking said data type of said result.

10. The method of claim 8, wherein said current instruction being an instruction to write to a register of a given address, said verification process comprises:
  determining an effect of said current instruction on said type stack and the given type of the operand which is written in this register at said given address;
  replacing the type entry of said table of register types at said given address by the type immediately above said previously stored type and above said given type of said operand which is written in said register at said given address.

11. The method of claim 1 wherein, when said current instruction is the target of a branching instruction, said verification method includes:
  verifying that said type stack is empty;
  continuing executing of the following instruction if said type stack is empty; and
  rejecting the program segment if said type stack is not empty.

12. An embedded system which can be reprogrammed by downloading program fragments, said embedded system including a least one microprocessor, one random-access memory, one input/output module, one electrically reprogrammable nonvolatile memory and one permanent memory, an installed main program and a virtual machine adapted to execute said installed main program and at least one program fragment using said microprocessor, wherein said embedded system includes at least one verification program module to verify a downloaded program fragment in accordance with a process comprising:
  initializing a type stack and a table of register types through data representing a state of said virtual machine at a starting of an execution of said temporarily stored object code;
  carrying out a verification process of said temporarily stored object code instruction by instruction, by discerning an existence, for each current instruction, of a target, a branching-instruction target, a target of an exception-handler call or a target of a subroutine call, and, said current instruction being a target of a branching instruction, said verification process consisting of verifying that said type stack is empty and rejecting said program fragment otherwise;
  carrying out a verification process and updating of an effect of said current instruction on the data types of said type stack and of said table of register types;
  verifying and updating an effect of said current instruction on the data types of said type stack and of said table of register types including:
    verifying that said type stack includes at least as many entries as said current instruction includes operands;
    unstacking and verifying that types of entries at the top of said stack are subtypes of the types of said operands of said current instruction; and
    stacking data types which are assigned to said results on said stack;
  said verification process being successful when said table of register types is not modified in the course of a verification of all of said instructions, and said verification process being carried out instruction by instruction until said table of register types is stable, with no modification having taken place, said verification process being interrupted and said program fragment being rejected, otherwise;
  said verification program module being installed in said permanent memory.

13. A system for transforming an object code of a program fragment including a series of instructions, in which operands of each instruction belong to data types manipulated by said instruction, an execution stack does not exhibit any overflow phenomenon and for each branching instruction, the types of stack variables at said branching are identical to the types of stack variables at targets of this branching, and an operand, of given type, written to a register by an instruction of said object code is reread from the same register by another instruction of said object code with the same given data type, into a standardized object code for said program fragment, wherein said transforming system includes, at least, installed in a memory of a development computer or workstation, a program module for transforming said object code into a standardized object code in accordance with a process of transforming including for all instructions of said object code comprising:
  annotating each current instruction with the data type of said type stack before and after execution of said current instruction, with an annotation data being calculated by means of analysis of the data stream relating to said current instruction;
  detecting, within said instructions and within each current instruction, an existence of branchings, or respectively of branching-targets, for which said execution stack is not empty, said detecting operation being carried out on the basis of said annotation data of said type of stack variables allocated to each current instruction; and, in case of detection of a non-empty execution stack,
  inserting instructions to transfer stack variables on either side of each said branching or branching target respectively, in order to empty contents of said execution stack into temporary registers before said branching and to reestablish said execution stack from said temporary registers after said branching;
  not inserting any transfer instruction otherwise, this method allowing thus to obtain said standardized object code for said program fragment, in which said operands of each instruction belong to the data types manipulated by said instruction, said execution stack does not exhibit any overflow phenomenon, said execution stack is empty at each branching instruction and at each branching-target instruction, in the absence of any modification to the execution of said program fragment; and
  verifying and updating an effect of said current instruction on the data types of said type stack including:
    verifying that said type stack includes at least as many entries as said current instruction includes operands;
    unstacking and verifying that types of entries at the top of said stack are subtypes of the types of said operands of said current instruction; and
    stacking data types which are assigned to said results on said stack; and carrying out a verification process, said verification process being successful when a table of register types is not modified in the course of a verification of all said instructions, and said verification process being carried out instruction by instruction until said table of register types is stable, with no modification having taken place, said verification process being interrupted and said program fragment being rejected, otherwise.

14. A computer program product which is recorded on a computer readable storage medium and can be loaded directly from a terminal into an internal memory of a reprogrammable embedded system equipped with a microprocessor and a rewritable memory, said embedded system making it possible to download and temporarily store a program fragment consisting of an object code including a series of instructions, executable by said microprocessor by way of a virtual machine equipped with an execution stack and with operand registers manipulated via said instructions and making it possible to interpret said object code, said computer program product including portions of object code to execute at least one of steps of verifying a program fragment downloaded onto said embedded system according to a verifying process, said verifying process comprising:

initializing a type stack and a table of register types through data representing a state of said virtual machine at initialization of execution of said temporarily stored object code;

carrying out a verification process of said temporarily stored object code instruction by instruction, by discerning an existence, for each current instruction, of a target, a branching-instruction target, a target of an exception-handler call or a target of a subroutine call, and, said current instruction being a target of a branching instruction, said verification process consisting in verifying that said execution stack is empty and rejecting said program fragment otherwise;

carrying out a verification process and an updating of an effect of said current instruction on the data types of said type stack and of said table of register types; and verifying and updating an effect of said current instruction on the data types of said type stack and of said table of register types including:

verifying that said type stack includes at least as many entries as said current instruction includes operands;

unstacking and verifying that types of entries at the top of said stack are subtypes of the types of said operands of said current instruction; and stacking data types which are assigned to said results on said stack;

said verification process being successful when said table of register types is not modified in the course of a verification of all said instructions, and said verification process being carried out instruction by instruction until said table of register types is stable, with no modification having taken place, said verification process being interrupted and said program fragment being rejected, otherwise.

15. A computer program product which is recorded on a computer readable storage medium including portions of object code to execute steps of a process of transforming an object code of a downloaded program fragment into a standardized object code for said program fragment, said process of transforming comprising:

annotating each instruction with a data type of a stack before and after execution of said current instruction, with said annotation data being calculated by means of an analysis of a data stream relating to said current instruction;

detecting, within said instructions and within each current instruction, an existence of branchings, or respectively of branching targets, for which an execution stack is not empty, said detecting operation being carried out on based on said annotation data of a type of stack variables allocated to each current instruction, and, in case of detection of a non-empty execution stack;

inserting instructions to transfer stack variables on either side of each said branching or branching target respectively, in order to empty contents of said execution stack into temporary registers before said branching and to reestablish the execution stack from said temporary registers after said branching;

not inserting any transfer instruction otherwise, this method allowing thus:

to obtain said standardized object code for said program fragment, in which the operands of each instruction belong to the data types manipulated by said instruction, said execution stack does not exhibit any overflow phenomenon, said execution stack is empty at each branching instruction and at each branching-target instruction, in absence of any modification to an execution of said program fragment; and to verify any update an effect of said current instruction on a data type of a type stack including:

verifying that said type stack includes at least as many entries as said current instruction includes operands;

unstacking and verifying that types of entries at the top of said stack are subtypes of the types of said operands of said current instruction;

stacking data types which are assigned to said results on said stack; and to carry out a verification process, said verification process being successful when a table of register types is not modified in the course of a verification of all said instructions, and said verification process being carried out instruction by instruction until said table of register types is stable, with no modification having taken place, said verification process being interrupted and said program fragment being rejected, otherwise.

16. A computer program product which is recorded on a computer readable storage medium and can be used in a reprogrammable embedded system, equipped with a microprocessor and a rewritable memory, said reprogrammable embedded system allowing to download a program fragment consisting of an object code, a series of instructions, executable by said microprocessor of said reprogrammable embedded system by means of a virtual machine equipped with an execution stack and with local variables or registers manipulated via instructions and making it possible to interpret said object code, said computer program product comprising:

program resources which can be read by said microprocessor of said embedded system via said virtual machine, to command execution of a procedure for managing a downloading of a downloaded program fragment;

program resources which can be read by said microprocessor of said embedded system via said virtual machine, to command execution of a procedure for verifying, by instruction, said object code which makes up said program fragment including:

program resources for verifying and updating an effect of said instruction on a data type of a type stack and of a table of register types including:

verifying that said type stack includes at least as many entries as said current instruction includes operands;

unstacking and verifying that types of entries at the top of said type stack are subtypes of the types of said operands of said current instruction; and stacking data types which are assigned to said results on said stack; and program resources for carrying out a verification process, said verification process being successful when said table of register types is not modified in the course of a verification of all said instructions, and said verification process being carried out instruction by instruction until said table of register types is stable, with no modification having taken place, said verification process being interrupted and said program fragment being rejected, otherwise;

program resources which can be read by said microprocessor of said embedded system via said virtual machine, to command execution of a downloaded program fragment subsequent to or in the absence of a conversion of said object code of said program fragment into a standardized object code for this same program fragment.

17. The computer program product as claimed in claim 16, additionally including at least one program resource which can be read by said microprocessor of said embedded system via said virtual machine, to command inhibition of execution, by said embedded system, of said program fragment in the case of an unsuccessful verification procedure of said program fragment.

\* \* \* \* \*